United States Patent
Kohama et al.

(10) Patent No.: US 9,461,305 B2
(45) Date of Patent: Oct. 4, 2016

(54) MAGNESIUM ALLOY FUEL CELL

(75) Inventors: Yasuaki Kohama, Miyagi (JP);
Michiru Sakamoto, Saga (JP);
Toshihiko Abe, Miyagi (JP)

(73) Assignee: Tohoku University, Miyagi (JP)

( * ) Notice: Subject to any disclaimer, the term of this patent is extended or adjusted under 35 U.S.C. 154(b) by 245 days.

(21) Appl. No.: 14/112,068

(22) PCT Filed: Mar. 27, 2012

(86) PCT No.: PCT/JP2012/057972
§ 371 (c)(1),
(2), (4) Date: Dec. 26, 2013

(87) PCT Pub. No.: WO2012/144301
PCT Pub. Date: Oct. 26, 2012

(65) Prior Publication Data
US 2014/0220458 A1    Aug. 7, 2014

(30) Foreign Application Priority Data

Apr. 18, 2011    (JP) .................. 2011-092297

(51) Int. Cl.
*H01M 4/36*    (2006.01)
*H01M 4/46*    (2006.01)
(Continued)

(52) U.S. Cl.
CPC .............. *H01M 4/466* (2013.01); *C22C 23/02* (2013.01); *H01M 12/06* (2013.01); *H01M 12/08* (2013.01); *H01M 4/628* (2013.01); *H01M 2300/0002* (2013.01); *H01M 2300/0014* (2013.01)

(58) Field of Classification Search
CPC ..... C22C 23/02; H01M 12/06; H01M 12/08; H01M 4/466; H01M 2300/0014; H01M 2300/0002; H01M 4/628

USPC .......................................................... 429/405
See application file for complete search history.

(56) References Cited

U.S. PATENT DOCUMENTS 3,849,868 A * 11/1974 Jost ............................... 228/155
4,997,622 A    3/1991 Regazzoni et al.
(Continued)

FOREIGN PATENT DOCUMENTS

| CN | 101026255 A | 8/2007 |
| CN | 102005577 A | 4/2011 |

(Continued)

OTHER PUBLICATIONS

International Preliminary Report on Patentability for PCT Application No. PCT/JP2012/057972, dated Oct. 22, 2013, 8 pages.
(Continued)

*Primary Examiner* — Gary Harris
(74) *Attorney, Agent, or Firm* — Westman, Champlin & Koehler, P.A.

(57) ABSTRACT

The invention provides magnesium fuel cells which can prevent the self-discharge of negative electrode materials and can produce electricity stably for a long term. A magnesium fuel cell includes a negative electrode material including a magnesium alloy, and an electrolytic solution for eluting magnesium ions from the negative electrode material. The magnesium alloy contains aluminum and calcium. The electrolytic solution is preferably an aqueous sodium chloride solution, an aqueous sodium hydroxide solution, an aqueous sodium hydrogencarbonate solution, an aqueous sodium percarbonate solution, or a mixture including two or more of these solutions.

6 Claims, 22 Drawing Sheets

(51) Int. Cl.
*C22C 23/02* (2006.01)
*H01M 12/06* (2006.01)
*H01M 12/08* (2006.01)
*H01M 4/62* (2006.01)

(56) References Cited

U.S. PATENT DOCUMENTS

2002/0197529 A1* 12/2002 Moriwaki ............ H01M 2/027
429/176
2003/0054208 A1* 3/2003 Oehr et al. ...................... 429/13

FOREIGN PATENT DOCUMENTS

| CN | WO 2012041247 A1 * | 4/2012 | ............ C22C 23/00 |
|---|---|---|---|
| JP | 56-6384 A | 1/1981 | |
| JP | 2004-537151 A | 12/2004 | |
| JP | 2008-81842 A | 4/2008 | |
| JP | 2010-182435 | 8/2010 | |
| JP | 2011-181382 A | 9/2011 | |
| JP | 2012-38666 A | 2/2012 | |
| WO | 2007/116872 A1 | 10/2007 | |

OTHER PUBLICATIONS

Japanese Office Action for Japanese Patent Application No. 2014-100605, dispatch date Aug. 12, 2014, 7 pages.
Extended European search report for European Patent Application No. 12774327.6-1360, dated Oct. 2, 2014, 6 pages.
International Search Report and Written Opinion for PCT Application No. PCT/JP2012/057972, dated Jun. 26, 2012, 11 pages (English translation of Search Report only).

* cited by examiner

MAGNESIUM ALLOY FUEL CELL

CROSS-REFERENCE TO RELATED APPLICATION

This Application is a Section 371 National Stage Application of International Application No. PCT/JP2012/057972, filed 27 Mar. 2012 and published as WO 2012/144301 A1 on 26 Oct. 2012, in Japanese, the contents of which are hereby incorporated by reference in their entirety.

TECHNICAL FIELD

The present invention relates to magnesium fuel cells.

BACKGROUND ART

Magnesium fuel cells are conventionally known which utilize air (oxygen) as a positive electrode material and metallic magnesium or an alloy thereof as a negative electrode material. For example, Japanese Patent Application Kokai Publication No. 2004-537151 discloses a magnesium fuel cell in which a magnesium alloy containing aluminum and/or tin and/or zinc is used as a negative electrode material. Japanese Patent Application Kokai Publication No. 2010-182435 discloses a magnesium fuel cell in which a magnesium alloy is used as a negative electrode material and an aqueous polyvalent carboxylate salt solution is used as an electrolytic solution.

SUMMARY OF INVENTION

Technical Problem

Magnesium is an abundant element (the eighth largest reserve on earth, 0.13% in seawater) and is far more inexpensive than lithium. Further, metallic magnesium has a large energy capacity per unit volume and its energy density is higher than that of metallic lithium. Furthermore, magnesium fuel cells are more compact and can realize high-capacity cells because the positive electrode is air and the substantial proportion of the cell volume is occupied by magnesium as the negative electrode material. Thus, magnesium fuel cells are very promising next-generation high-capacity cells as an alternative to lithium ion batteries.

However, conventional magnesium fuel cells have a problem in that the capacitance is unsatisfactory because magnesium in the electrolytic solution causes self-discharge. This self-discharge is a phenomenon in which as soon as the negative electrode metal is dissolved, the formed electrons react with hydrogen ions in the electrolytic solution to generate hydrogen instead of allowing the current to flow by migrating to the positive electrode. The self-discharge occurs markedly in an acidic electrolytic solution having a high concentration of hydrogen ions.

A possible approach to preventing self-discharge is to use an alkaline electrolytic solution. However, the use of an alkaline electrolytic solution results in the formation of an insoluble magnesium hydroxide film on the surface of magnesium alloy as the negative electrode. Because this film is insulating to electricity or ions, the cell reaction does not take place and the flow of electricity lasts only shortly.

The present invention has been made in view of the circumstances described above. It is therefore an object of the invention to provide magnesium fuel cells which can prevent the self-discharge of negative electrode materials and can produce electricity stably for a long term.

Solution to Problem

The present invention is directed to a magnesium fuel cell including a negative electrode material including a magnesium alloy, and an electrolytic solution for eluting magnesium ions from the negative electrode material, the magnesium alloy containing aluminum and calcium.

It is preferable that the magnesium alloy contain 3 wt % to 9 wt % aluminum and 1 wt % to 3 wt % calcium.

It is preferable that the electrolytic solution be at least one selected from the group consisting of an aqueous sodium chloride solution, an aqueous sodium hydroxide solution, an aqueous sodium hydrogencarbonate solution and an aqueous sodium percarbonate solution.

Advantageous Effects of Invention

The present invention can provide magnesium fuel cells which can prevent the self-discharge of negative electrode materials and can produce electricity stably for a long term.

EMBODIMENTS FOR CARRYING OUT THE INVENTION

Hereinbelow, embodiments of the invention will be described in detail with reference to the drawings.

A magnesium fuel cell according to the invention is characterized in that it includes a negative electrode material including a magnesium alloy containing aluminum and calcium. Here, the term "magnesium fuel cell" refers to, for example, a magnesium air cell which utilizes oxygen in air as a positive electrode active material (an electron acceptor) and magnesium as a negative electrode active material (an electron donor). Magnesium in the negative electrode is eluted into the electrolytic solution in the form of magnesium ions by releasing electrons. On the other hand, oxygen and water accept the electrons at the positive electrode to form hydroxide ions. As a whole of the cell, magnesium, oxygen and water form magnesium hydroxide ($Mg(OH)_2$) while generating electromotive force between the electrodes. The reactions taking place at the positive electrode and the negative electrode are represented by the following equations, respectively.

Positive electrode: $O_2 + 2H_2O + 4e^- \rightarrow 4OH^-$

Negative electrode: $2Mg \rightarrow 2Mg^{2+} + 4e^-$

Whole: $2Mg + O_2 + 2H_2O \rightarrow 2Mg(OH)_2 \downarrow$

Figure 1:
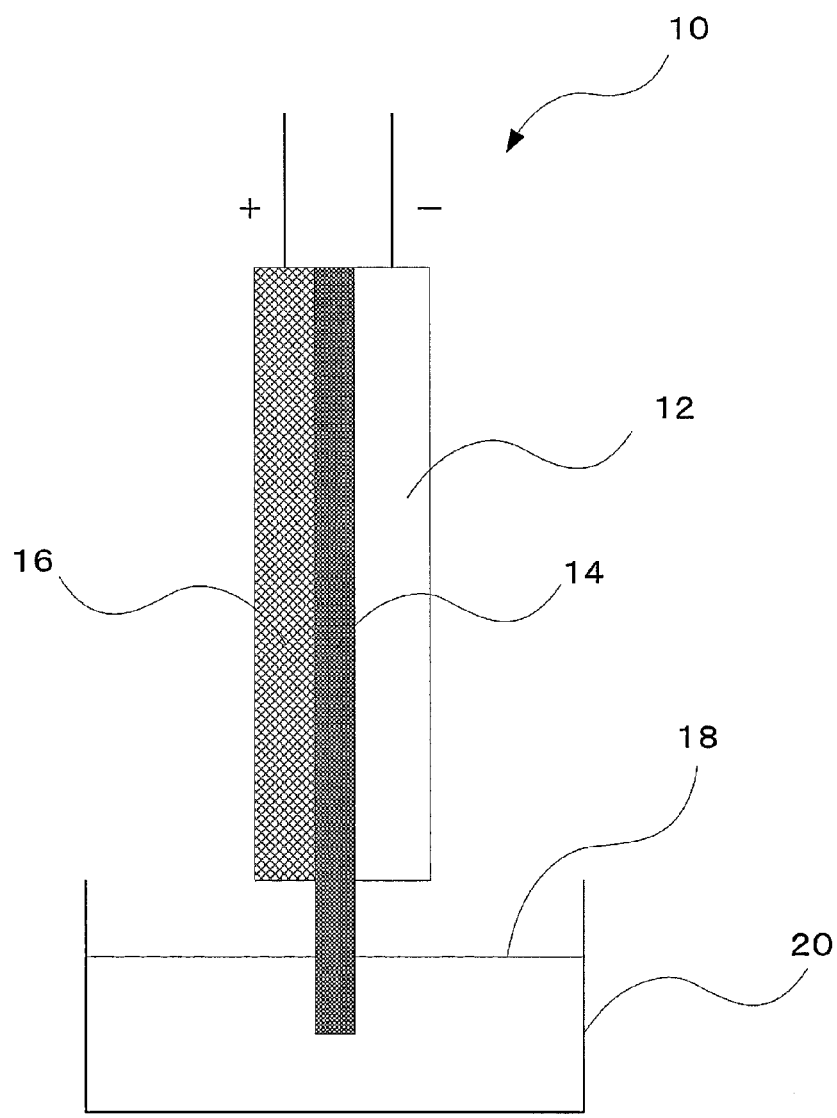
FIG. 1 illustrates an exemplary configuration of a magnesium fuel cell.

FIG. 1 is a view illustrating a configuration of a magnesium fuel cell 10 (hereinafter, sometimes referred to simply as cell 10) according to an embodiment of the invention.

As illustrated in FIG. 1, the cell 10 includes a negative electrode material 12 including a magnesium alloy, a positive electrode collector 16 for supplying electrons to air (oxygen) as a positive electrode material, a separator 14 disposed between the negative electrode material 12 and the positive electrode collector 16, an electrolytic solution 18 for eluting magnesium ions ($Mg^{2+}$) from the negative electrode, and an electrolytic solution tank 20 for storing the electrolytic solution 18.

The negative electrode material 12 is composed of a magnesium alloy. The magnesium alloy means an alloy based on magnesium (Mg), for example, an alloy containing 50 wt % or more magnesium. For example, Mg—Al alloys, Mg—Mn alloys, Mg—Zn alloys, Mg—Al—Zn alloys and Mg—Zn—Zr alloys are known as magnesium alloys. In the invention, magnesium alloys containing aluminum (Al) and calcium (Ca) are used. The content of aluminum (Al) in the magnesium alloy is not particularly limited, but is preferably 3 wt % to 9 wt %, more preferably 5 wt % to 7 wt %, and most preferably 6 wt % relative to the whole of the magnesium alloy. The content of calcium (Ca) in the magnesium alloy is not particularly limited, but is preferably 1 wt % to 3 wt %, more preferably 1.5 wt % to 2.5 wt %, and most preferably 2 wt % relative to the whole of the magnesium alloy.

Elements other than aluminum and calcium may be added to the magnesium alloy. Examples of such additional elements include Zn, Mn, Si, Cu, Li, Na, K, Fe, Ni, Ti and Zr. These elements may be added at a proportion of, for example, not more than 1 wt % relative to the whole of the magnesium alloy. In particular, Zn may be added at a proportion of, for example, not more than 2 wt % relative to the whole of the magnesium alloy.

The shapes of the magnesium alloy used as the negative electrode material 12 are not particularly limited. For example, the magnesium alloy may be shaped into a sheet, particles or powder.

Usual magnesium alloys may become ignited easily when shaped into the form of particles or powder. In contrast, the magnesium alloy used in the invention exhibits very high flame retardancy as a result of containing aluminum and calcium and does not become ignited easily even when shaped into particles or powder, thus ensuring high safety.

The magnesium fuel cell of the invention involves a magnesium alloy containing aluminum (Al) and calcium (Ca). The magnesium alloy having such a composition exhibits appropriate reactivity and performs well as a cell material. Further, the magnesium alloy with such a composition has a capability of suppressing combustion (a capability of suppressing a reaction) and is a highly valuable industrial material. The magnesium alloy used in the invention can display excellent performance as a cell material due to the synergetic effect of these conflicting properties. The magnesium alloy containing aluminum and calcium usually has a multilayered structure formed of two phases: a metallic Mg phase (a solid solution) and a compound phase ($Al_2Ca$). Because the compound phase is relatively inactive, the alloy exhibits low reactivity on the macroscopic level. This has been confirmed by experience. When this multiphase structure is sufficiently fine, the corrosive reaction (the dissolution reaction) takes place uniformly and mildly as a whole. This too probably contributes partly to the above reactivity and reaction suppressive capability. That is, it is probable that the high reactivity of the parent phase of the magnesium alloy and the suppression of the reaction by the inactive second phase make great contributions to the excellent performance as the negative electrode material in the cell.

It should be noted that the scope of the invention is not limited by these assumptions.

The magnesium alloy used as the negative electrode material 12 may be produced by any method without limitation, and may be produced by, for example, a method disclosed in Japanese Patent Application Kokai Publication No. H10-280062.

The separator 14 is disposed between the negative electrode material 12 and the positive electrode collector 16. The separator 14 prevents a short circuit between the negative electrode material 12 and the positive electrode collector 16, and also has a role of drawing up the electrolytic solution 18 stored in the electrolytic solution tank 20 and holding the electrolytic solution 18. The separator 14 is not particularly limited. Examples thereof include polyethylene fibers, polypropylene fibers, glass fibers, resin nonwoven fabrics, glass nonwoven fabrics and filter papers.

The positive electrode collector 16 has a role of supplying electrons to oxygen in air as the positive electrode material. The material of the positive electrode collector 16 is not particularly limited as long as the material has conductivity. Examples thereof include carbonaceous materials such as activated carbons, carbon fibers and carbon felts, and metal materials such as iron and copper. Particularly preferably, a carbon powder is used as the material of the positive electrode collector 16 in view of the facts that this material has a large area of contact with atmospheric oxygen and has excellent collection efficiency.

The electrolytic solution 18 serves as a medium in which magnesium ions ($Mg^{2+}$) formed at the negative electrode material 12 are eluted, and also has a role of supplying water ($H_2O$) to the positive electrode for the reaction with oxygen. The electrolytic solution 18 may be an acidic, alkaline or neutral aqueous solution. For example, the electrolytic solution may be at least one selected from the group consisting of an aqueous sodium chloride solution, an aqueous sodium hydroxide solution, an aqueous sodium hydrogencarbonate solution and an aqueous sodium percarbonate solution. Alternatively, other types of electrolytic solutions such as aqueous fluoride solutions and halogen-containing aqueous solutions may be used. Still other types of electrolytic solutions such as an aqueous polyvalent carboxylate solution disclosed in Japanese Patent Application Kokai Publication No. 2010-182435 may be used.

The configurations of the electrolytic solution tank 20 such as shapes and materials are not particularly limited as long as the electrolytic solution 18 can be stored therein. For example, the electrolytic solution tank 20 may be a container formed of a synthetic resin such as polypropylene.

Wires or the like made of a conductive material such as copper may be attached to the surface of the positive electrode collector 16 in contact with air. With such a configuration, the area of contact between the positive electrode collector 16 and oxygen can be increased and the collection efficiency at the positive electrode of the cell 10 can be further enhanced.

While the cell 10 in FIG. 1 is illustrated as having a sequential stack of the negative electrode material 12, the separator 14 and the positive electrode collector 16, the configurations of the cells 10 are not limited thereto. For example, the cell 10 may have a configuration in which the separator 14 and the positive electrode collector 16 are sequentially wound around a sheet of the negative electrode material 12.

EXAMPLES

Hereinafter, Examples of the present invention will be described without limiting the scope of the invention to such Examples.

Example 1

In Example 1, a test was carried out in which magnesium alloys with various compositions were soaked in salt water.

First, the following five samples were prepared.

Sample 1: magnesium alloy containing 6 wt % Al and 2 wt % Ca

Sample 2: magnesium alloy containing 6 wt % Al

Sample 3: magnesium alloy containing 2 wt % Ca

Sample 4: magnesium alloy containing 5 wt % Ca

Sample 5: single magnesium metal with 99.95% purity

Next, the above five samples were soaked in 18 wt % salt water.

Figure 2:
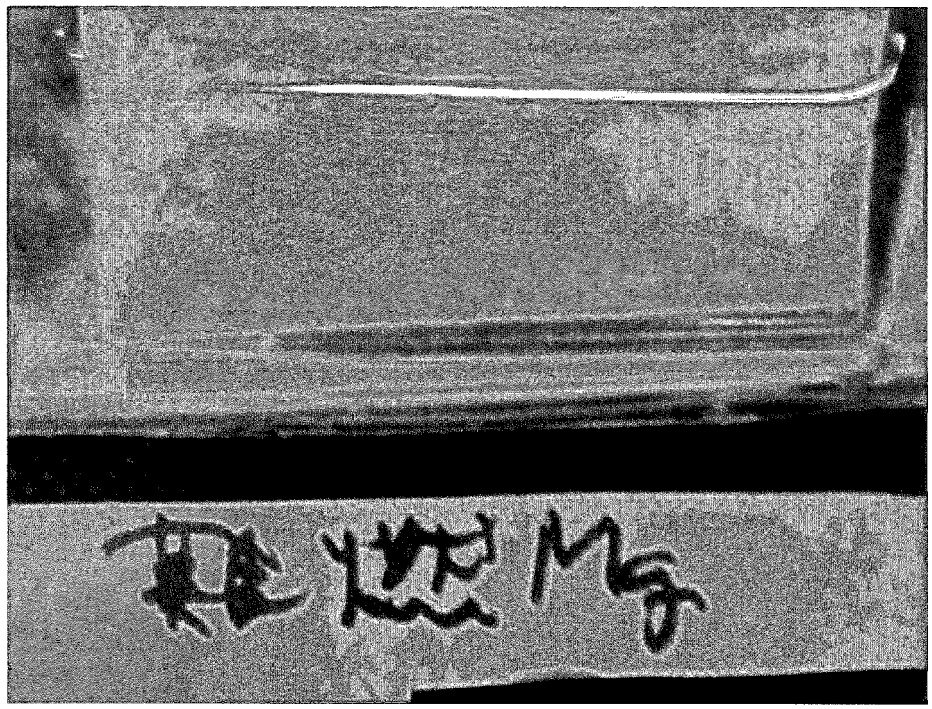
FIG. 2 is a picture showing a sample 1 soaked in 18 wt % salt water.
Figure 3:
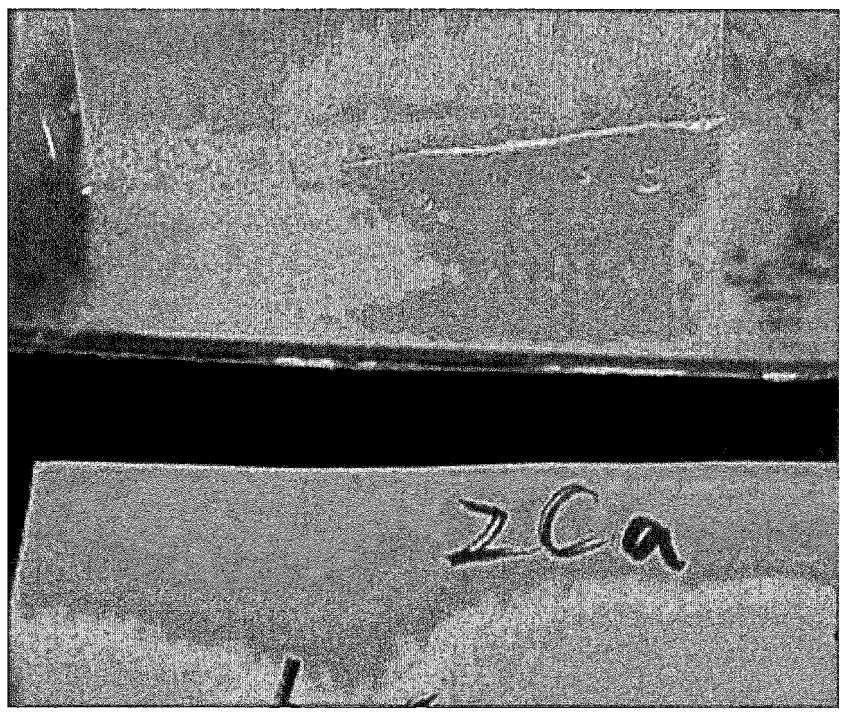
FIG. 3 is a picture showing a sample 3 soaked in 18 wt % salt water.
Figure 4:
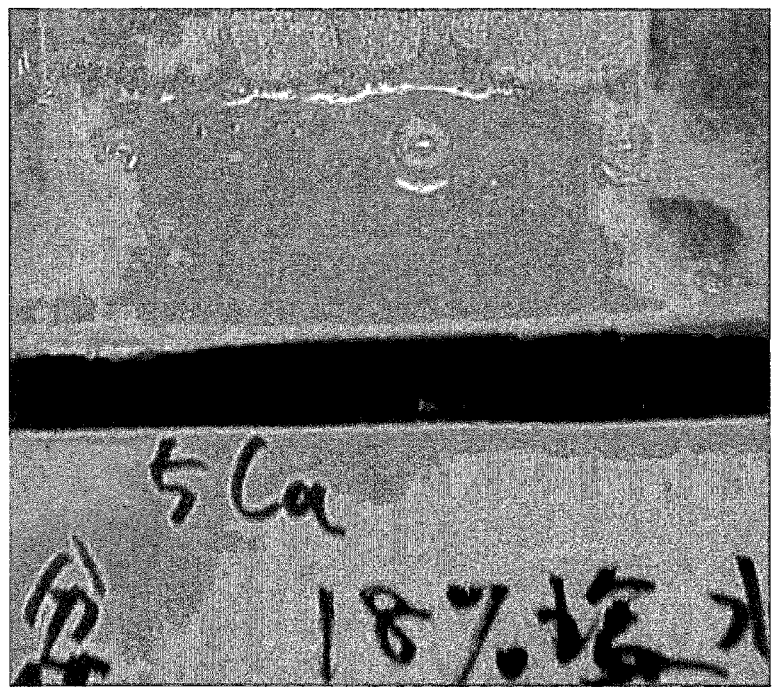
FIG. 4 is a picture showing a sample 4 soaked in 18 wt % salt water.

As a result, the sample 1 was not substantially dissolved in the salt water. On the other hand, the sample 5 was dissolved in the salt water with heavy generation of hydrogen. The samples 2 to 4 also were dissolved in the salt water with generation of hydrogen. The pictures in FIGS. 2 to 4 show these results.

The weight decreases of the samples 1 to 5 after the soak in 18% salt water were measured. As a result, the samples had weight decreases in the following order.

Sample 1<Sample 2<Sample 3<Sample 4<Sample 5

The above experiment results have demonstrated that a magnesium alloy containing aluminum and calcium (the sample 1) has a markedly lower rate of dissolution in salt water than that of single magnesium metal (the sample 5) or other magnesium alloys (the samples 2 to 4). That is, it has been demonstrated that when a magnesium alloy containing aluminum and calcium is used as a negative electrode material 12, the self-discharge of the negative electrode material 12 in an electrolytic solution 18 (salt water) can be highly reliably prevented.

Figure 5:
FIG. 5 is a picture showing the surface condition of the sample 1 after being soaked in 18% salt water for 122 hours.
Figure 6:
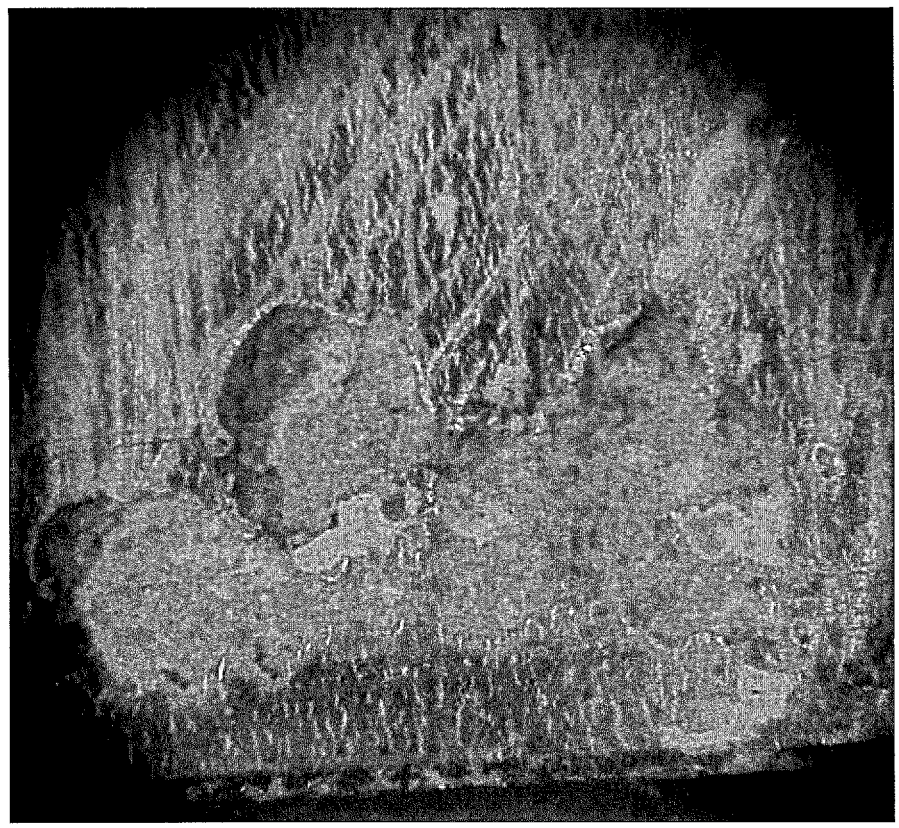
FIG. 6 is a picture showing the surface condition of a sample 2 after being soaked in 18% salt water for 122 hours.

FIG. 5 is a picture showing the surface condition of the sample 1 after being soaked in 18% salt water for 122 hours. FIG. 6 is a picture showing the surface condition of the sample 2 after being soaked in 18% salt water for 122 hours. The weight decrease of the sample 1 was 19 mg whilst that of the sample 2 was 295 mg.

As shown in FIG. 5, a film of white powder had been attached on the surface of the sample 1 after the soak in salt water. This white powder film was removed when rubbed with a tip of a knife, and an underlying gloss metal surface became visible. Based on common sense, soaking of magnesium in salt water will cause the surface to be dissolved and become rough and will result in the attachment of magnesium chloride ($MgCl_2$). This was exactly the case in single magnesium metal (the sample 5), and the sample soaked in salt water overnight exhibited a surface with a starch-like plain white powder. In complete contrast to this, the magnesium alloy containing aluminum and calcium (the sample 1) was not substantially dissolved in the salt water and the sample surface had a white uneven film. This film was probably calcium chloride ($CaCl_2$) or $MgCl_2+CaCl_2$, and probably prevented the dissolution of the sample surface. It is further considered that this film has an effect of allowing the magnesium alloy to be dissolved slowly into salt water only when the magnesium alloy is used as a negative electrode material in a cell as will be described later for such reasons (or any of such reasons) as because the film is fragile, because the film has voids and because the film has conductivity. This is probably the reason why the magnesium alloy produced a nearly theoretical current value.

It should be noted that the above considerations are based on the knowledge of the present inventors at the time of this invention, and the scope of the invention is not limited by these assumptions.

Based on the above experiment results, it has been demonstrated that when a magnesium alloy containing aluminum and calcium (the sample 1) is used as a negative electrode material in a cell, the self-discharge of the negative electrode material in salt water can be prevented. It has been further demonstrated that such a negative electrode material is dissolved in a stable manner to produce a nearly theoretical current value.

Example 2

In the experiment of Example 2, magnesium fuel cells were fabricated under the following conditions 1 to 5 and were operated to supply current to motors.

(Conditions 1)
Negative electrode material: magnesium alloy containing 6 wt % Al and 2 wt % Ca
Positive electrode collector: thick carbon fiber fabric
Electrolytic solution: 18 wt % salt water (Conditions 2)
Negative electrode material: magnesium alloy containing 6 wt % Al and 2 wt % Ca
Positive electrode collector: thin carbon fiber fabric
Electrolytic solution: 18 wt % salt water (Conditions 3)
Negative electrode material: magnesium alloy containing 6 wt % Al and 2 wt % Ca
Positive electrode collector: carbon felt
Electrolytic solution: concentrated seawater (sodium chloride concentration 18 wt %)

Figure 7:
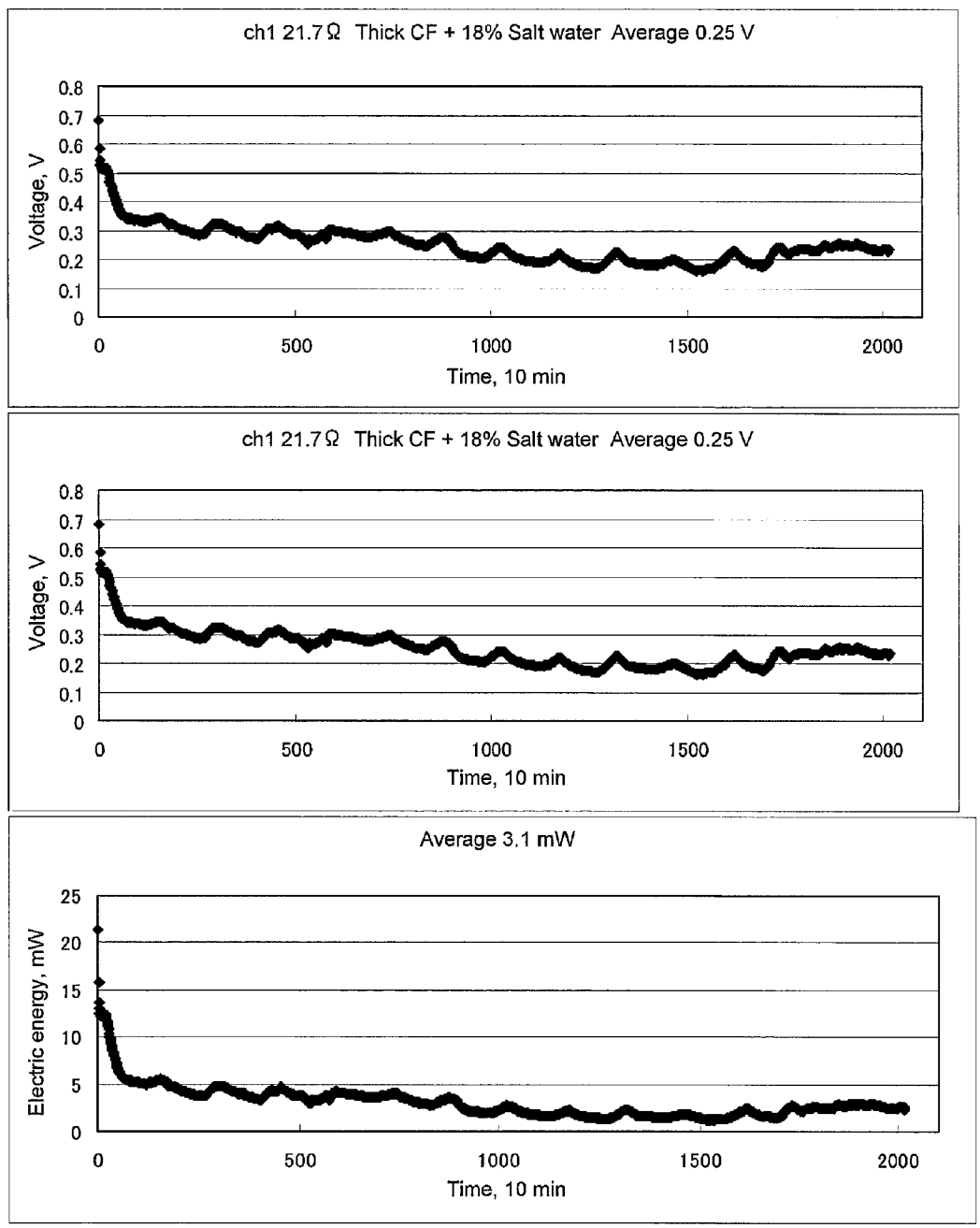
FIG. 7 is a set of graphs illustrating changes in voltage, current and electric energy when a cell fabricated under conditions 1 was operated for 14 days (336 hours).
Figure 8:
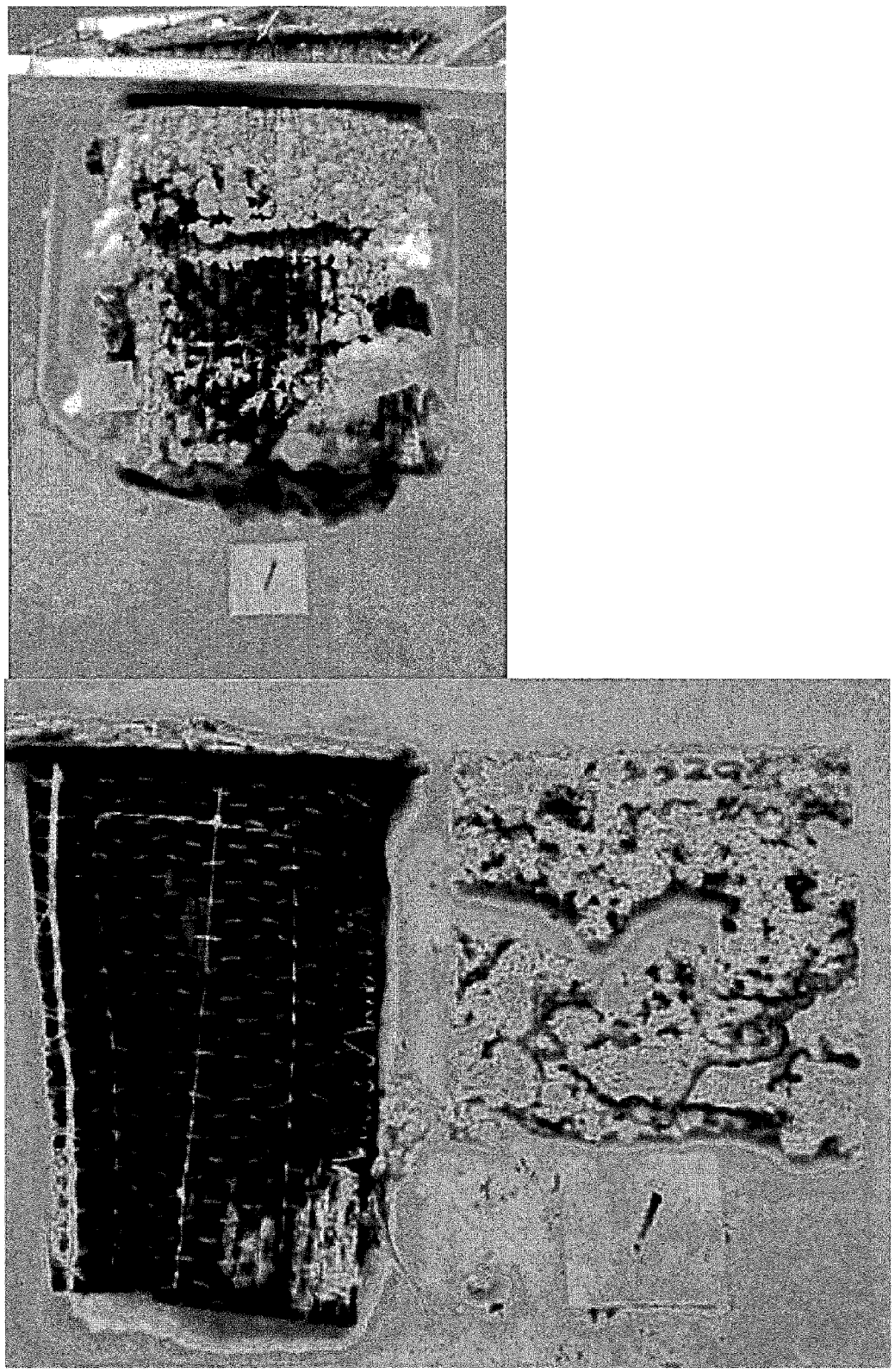
FIG. 8 is a set of pictures showing a positive electrode collector and a negative electrode material (a magnesium alloy) after the cell fabricated under conditions 1 was operated for 14 days.

(Conditions 4)
Negative electrode material: magnesium alloy containing 6 wt % Al and 2 wt % Ca
Positive electrode collector: carbon felt
Electrolytic solution: seawater (Conditions 5)
Negative electrode material: magnesium alloy containing 6 wt % Al and 2 wt % Ca
Positive electrode collector: carbon felt
Electrolytic solution: seawater+aqueous NaOH solution FIG. 7 is a set of graphs illustrating changes in voltage, current and electric energy when the cell fabricated under the conditions 1 was operated for 14 days (336 hours). FIG. 8 is a set of pictures showing the positive electrode collector and the negative electrode material (the magnesium alloy) after the cell fabricated under the conditions 1 was operated for 14 days.

The 14-day experiment under the conditions 1 resulted in an average voltage of 0.251 V, an average current of 11.6 mA, an average electric energy of 3.08 mW, a total current of 3890 mAh and a total electric energy of 1036 mWh.

Figure 9:
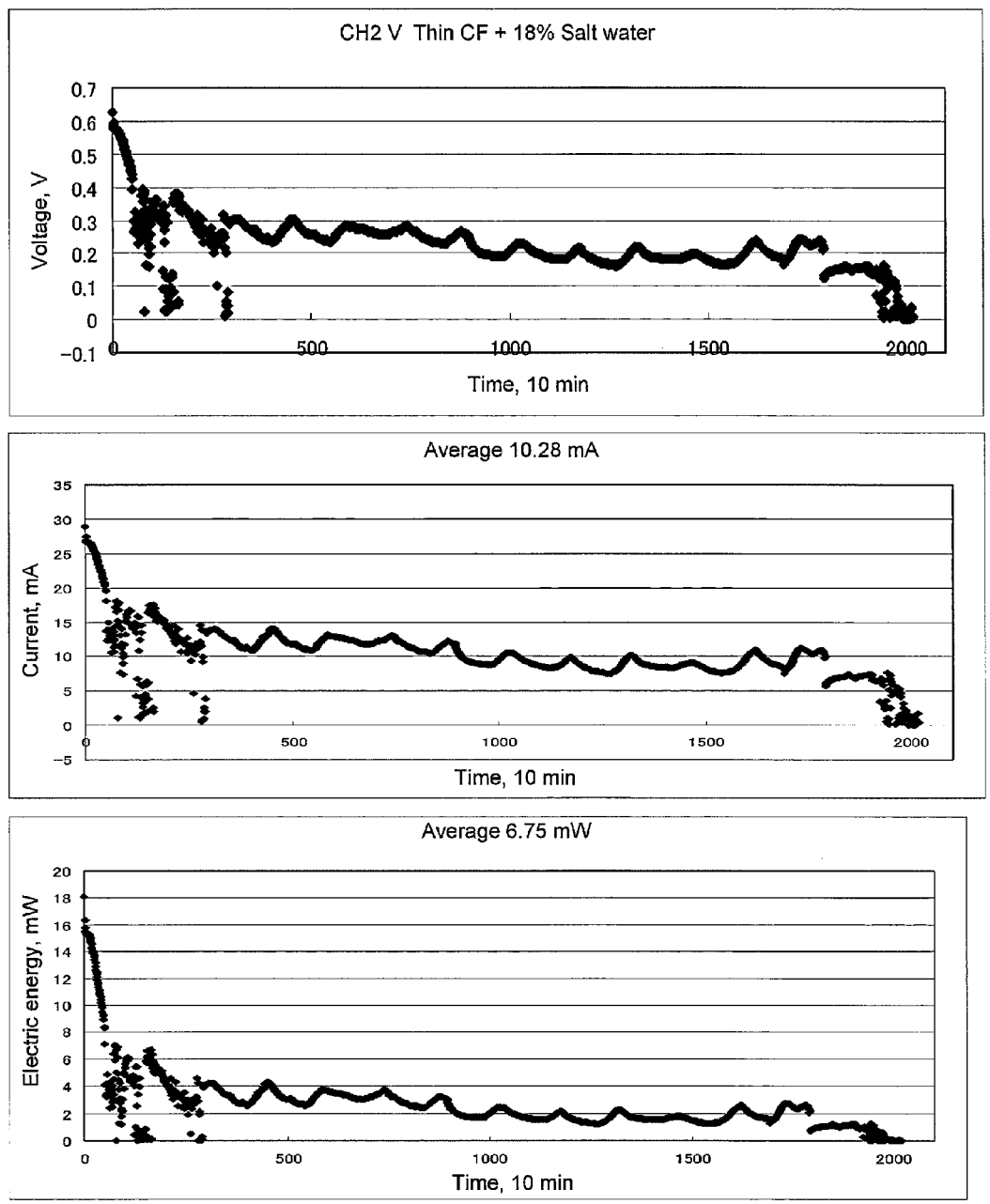
FIG. 9 is a set of graphs illustrating changes in voltage, current and electric energy when a cell fabricated under conditions 2 was operated for 14 days (336 hours).
Figure 10:
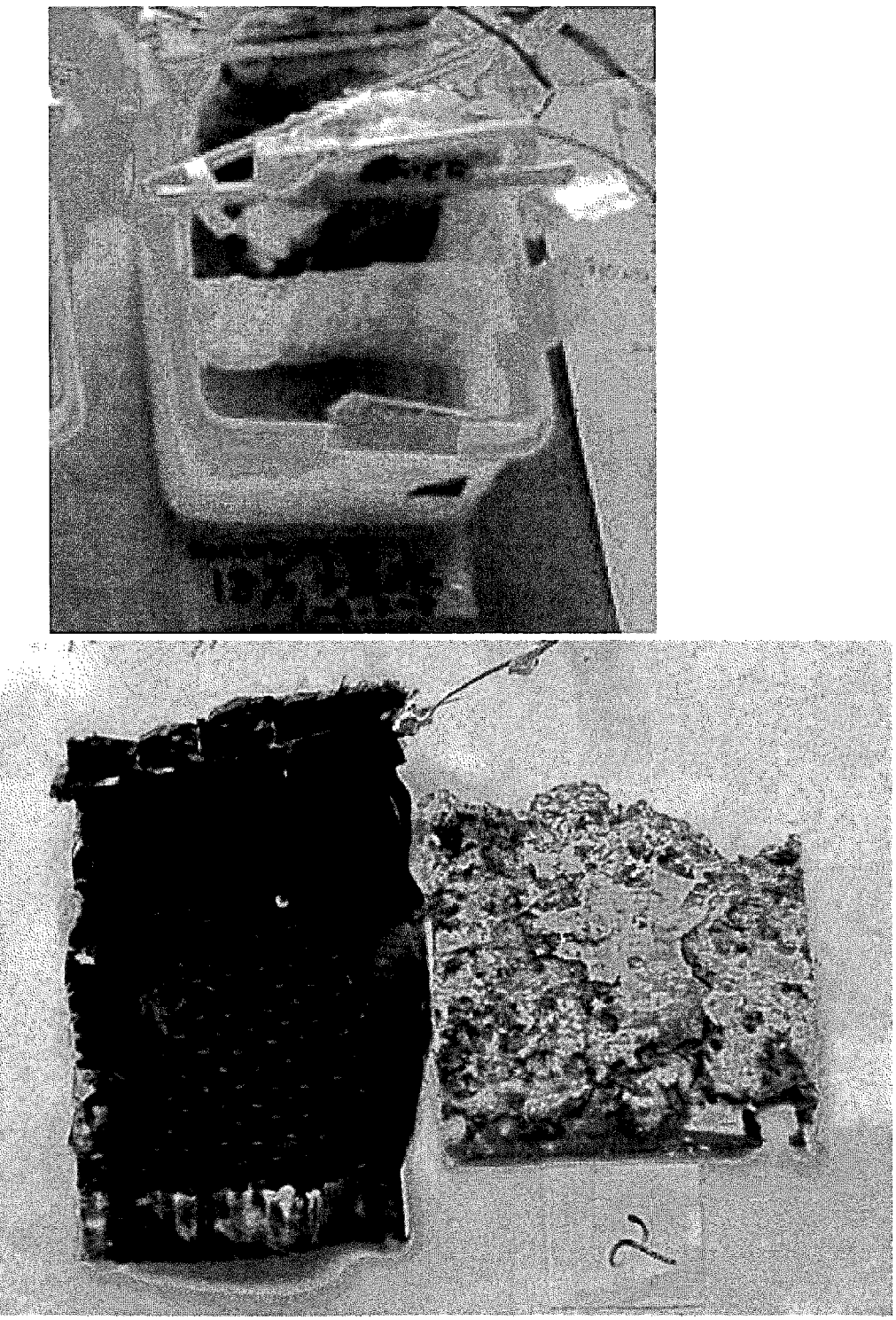
FIG. 10 is a set of pictures showing a positive electrode collector and a negative electrode material (a magnesium alloy) after the cell fabricated under conditions 2 was operated for 14 days.

FIG. 9 is a set of graphs illustrating changes in voltage, current and electric energy when the cell fabricated under the conditions 2 was operated for 14 days (336 hours). FIG. 10 is a set of pictures showing the positive electrode collector and the negative electrode material (the magnesium alloy) after the cell fabricated under the conditions 2 was operated for 14 days.

The 14-day experiment under the conditions 2 resulted in an average voltage of 0.223 V, an average current of 10.28 mA, an average electric energy of 2.59 mW, a total current of 3456 mAh and a total electric energy of 869 mWh.

Figure 11:
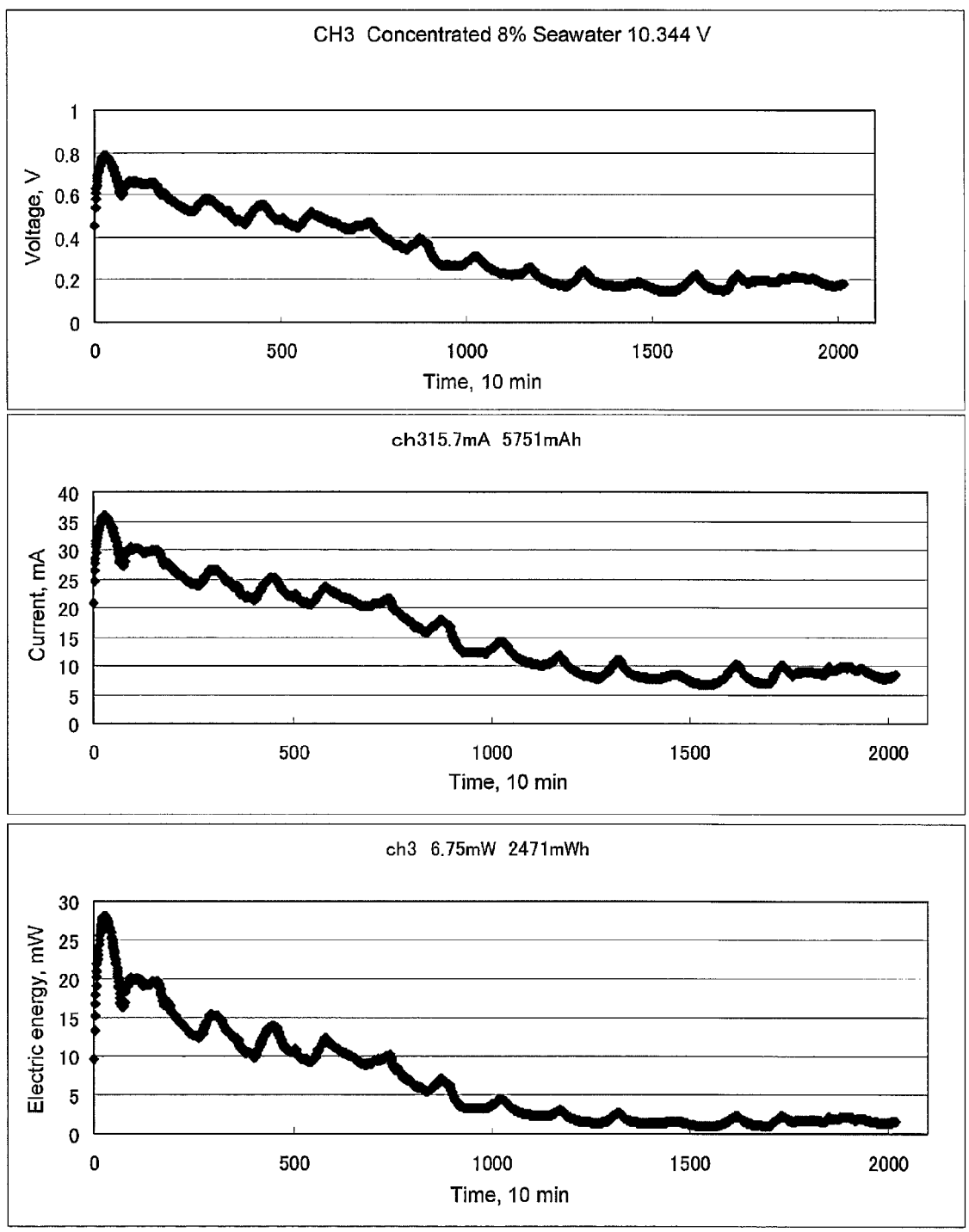
FIG. 11 is a set of graphs illustrating changes in voltage, current and electric energy when a cell fabricated under conditions 3 was operated for 14 days (336 hours).
Figure 12:
FIG. 12 is a set of pictures showing a positive electrode collector and a negative electrode material (a magnesium alloy) after the cell fabricated under conditions 3 was operated for 14 days.
Figure 12:
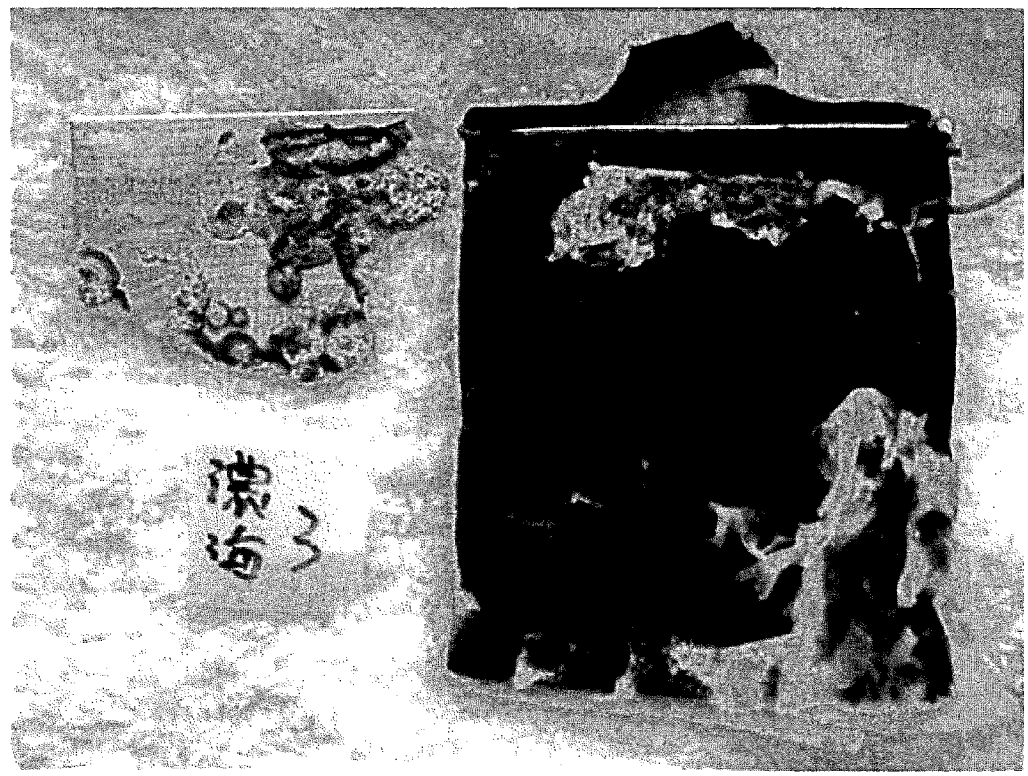

FIG. 11 is a set of graphs illustrating changes in voltage, current and electric energy when the cell fabricated under the conditions 3 was operated for 14 days (336 hours). FIG. 12 is a set of pictures showing the positive electrode collector and the negative electrode material (the magnesium alloy) after the cell fabricated under the conditions 3 was operated for 14 days.

The 14-day experiment under the conditions 3 resulted in an average voltage of 0.344 V, an average current of 15.71 mA, an average electric energy of 6.75 mW, a total current of 5751 mAh and a total electric energy of 2471 mWh.

Figure 13:
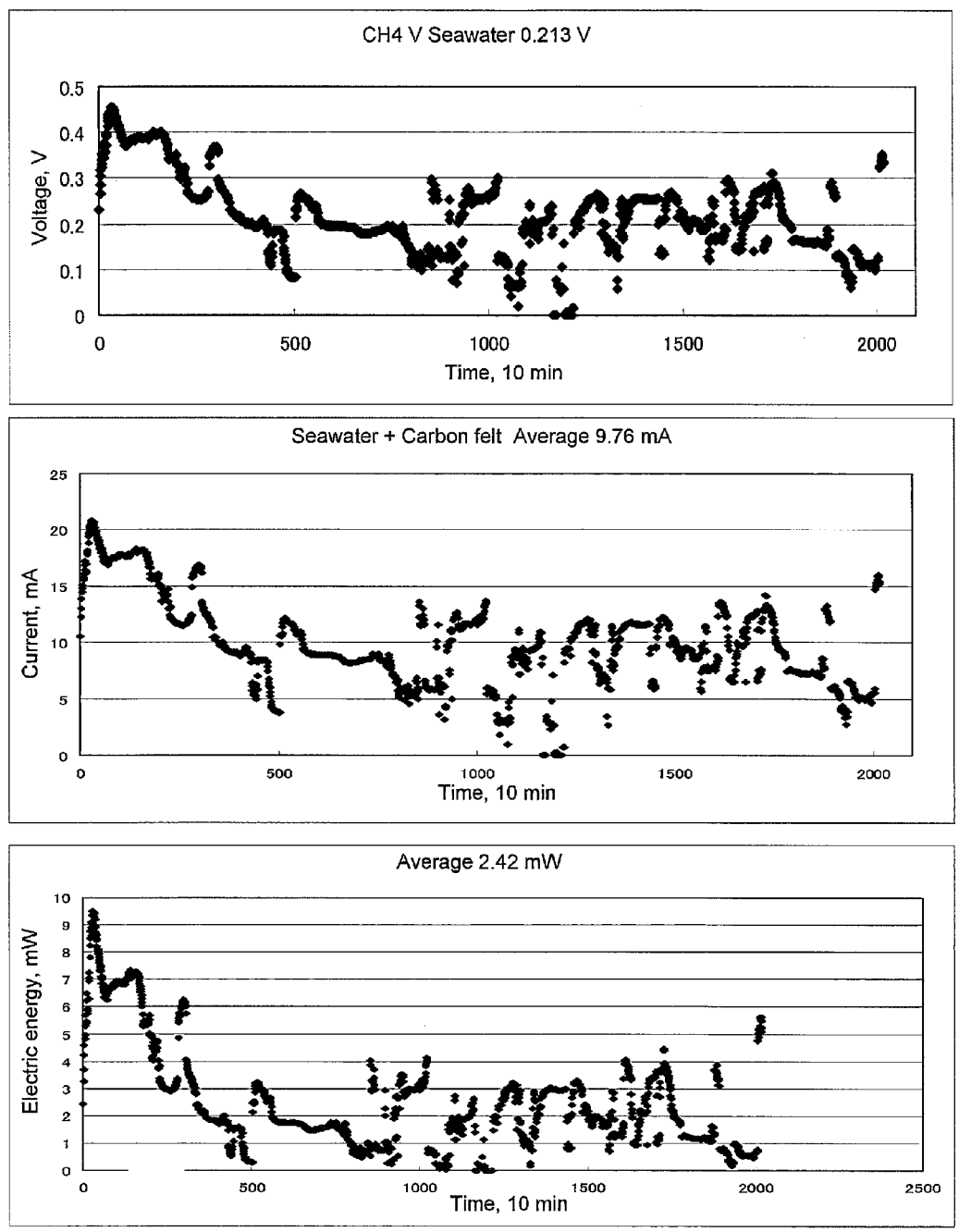
FIG. 13 is a set of graphs illustrating changes in voltage, current and electric energy when a cell fabricated under conditions 4 was operated for 14 days (336 hours).
Figure 14:
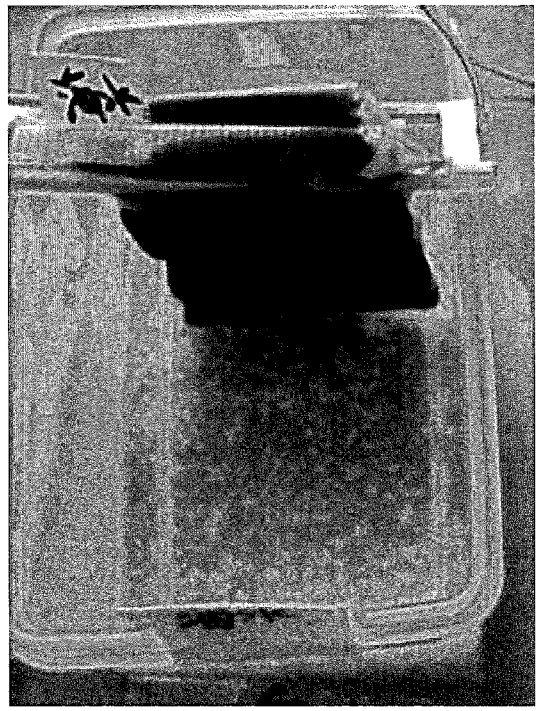
FIG. 14 is a set of pictures showing a positive electrode collector and a negative electrode material (a magnesium alloy) after the cell fabricated under conditions 4 was operated for 14 days.
Figure 14:
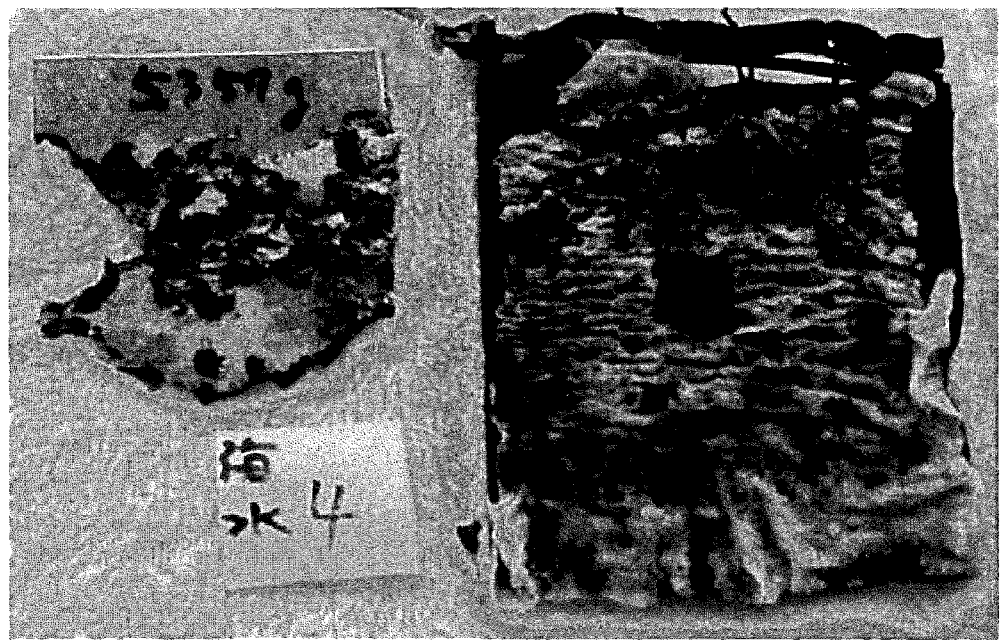

FIG. 13 is a set of graphs illustrating changes in voltage, current and electric energy when the cell fabricated under the conditions 4 was operated for 14 days (336 hours). FIG. 14 is a set of pictures showing the positive electrode collector and the negative electrode material (the magnesium alloy) after the cell fabricated under the conditions 4 was operated for 14 days.

The 14-day experiment under the conditions 4 resulted in an average voltage of 0.213 V, an average current of 9.76 mA, an average electric energy of 2.42 mW, a total current of 3574 mAh and a total electric energy of 886 mWh.

Figure 15:
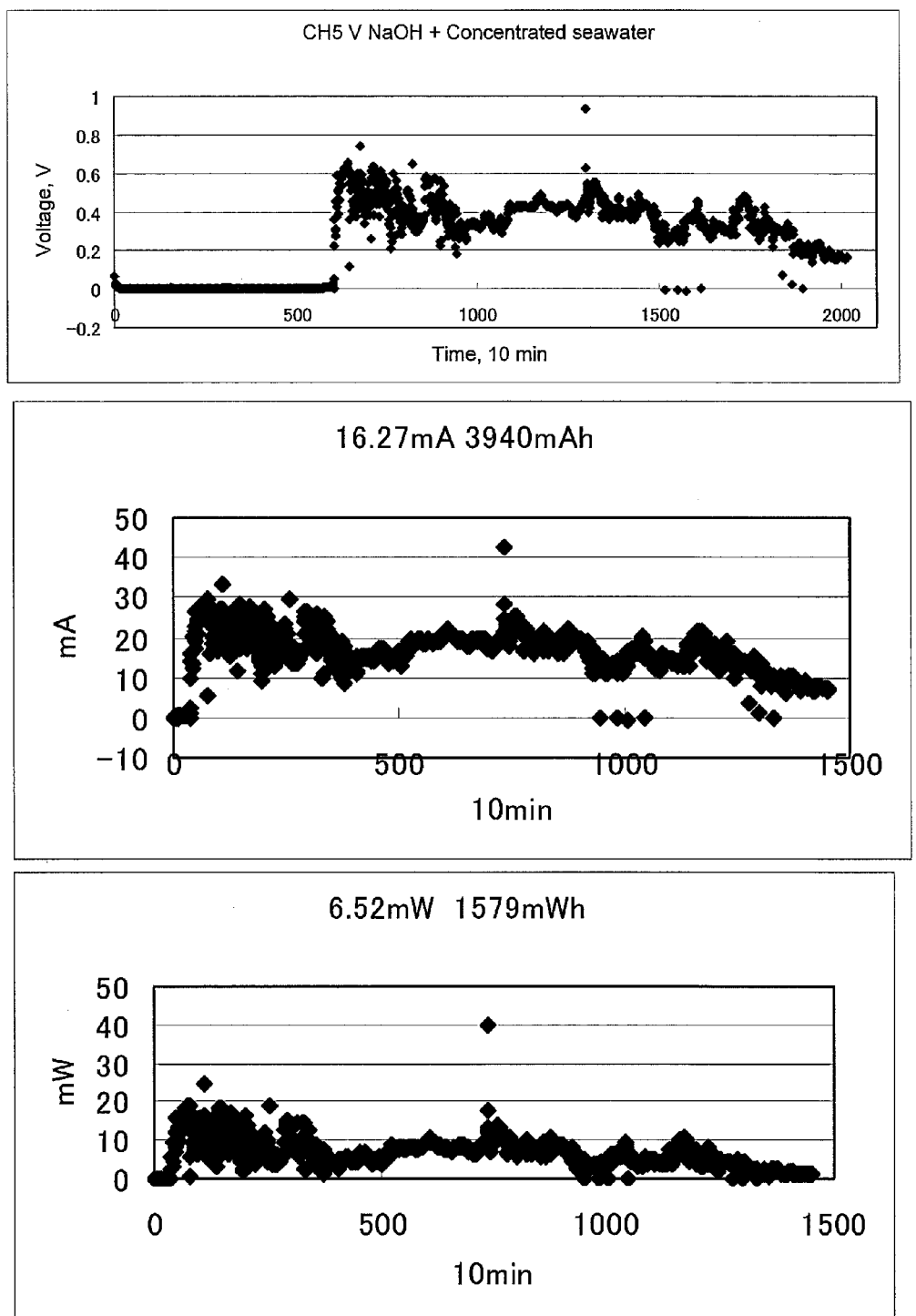
FIG. 15 is a set of graphs illustrating changes in voltage, current and electric energy when a cell fabricated under conditions 5 was operated for 14 days (336 hours).
Figure 16:
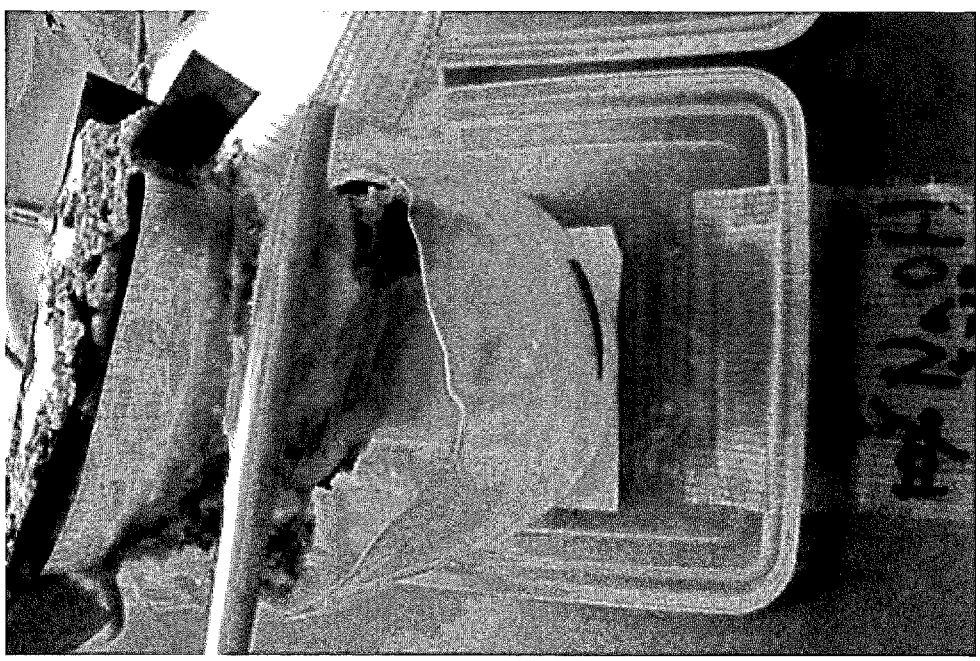
FIG. 16 is a set of pictures showing a positive electrode collector and a negative electrode material (a magnesium alloy) after the cell fabricated under conditions 5 was operated for 14 days.
Figure 16:
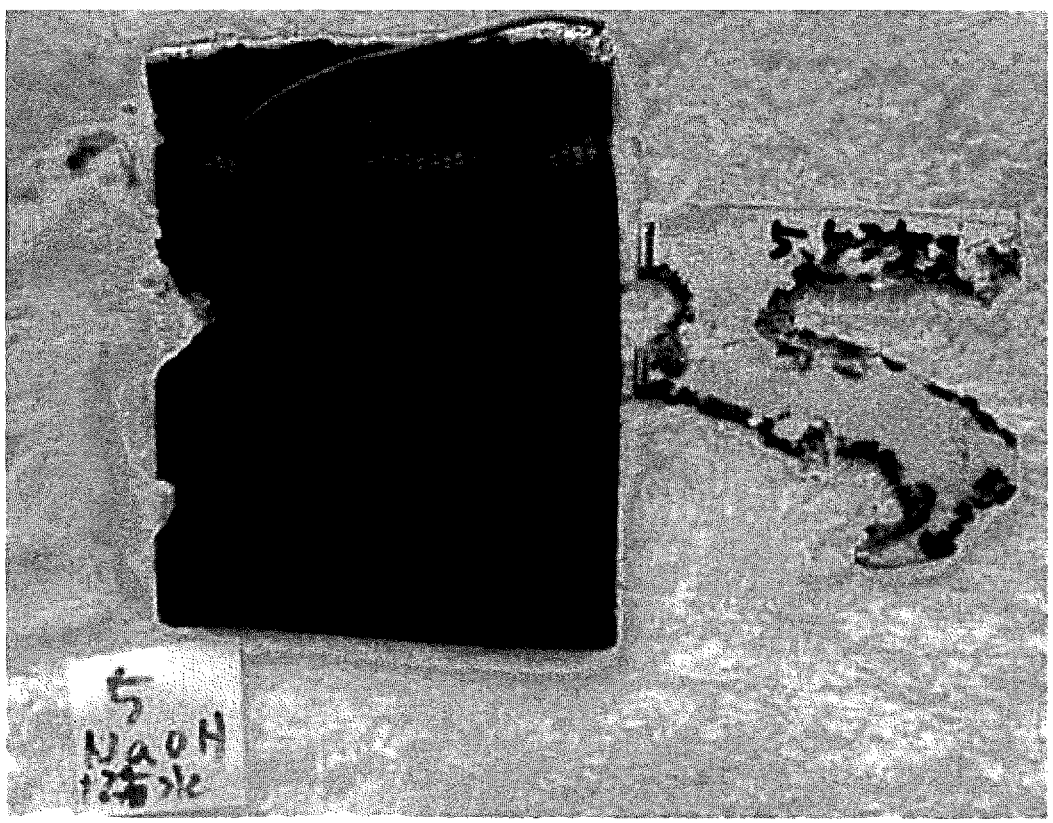

FIG. 15 is a set of graphs illustrating changes in voltage, current and electric energy when the cell fabricated under the conditions 5 was operated for 14 days (336 hours). FIG. 16 is a set of pictures showing the positive electrode collector and the negative electrode material (the magnesium alloy) after the cell fabricated under the conditions 5 was operated for 14 days. In this current flow experiment with the cell under the conditions 5, the electrolytic solution was an aqueous sodium hydroxide solution for the first 4 days, and seawater was thereafter added to the electrolytic solution. Thus, a flow of current was not observed for the first 4 days and the current flowed only for the last 10 days after the addition of seawater.

The 10-day experiment under the conditions 5 after the addition of seawater resulted in an average voltage of 0.361 V, an average current of 16.27 mA, an average electric energy of 6.52 mW, a total current of 3940 mAh and a total electric energy of 1579 mWh.

The following findings were obtained based on the experiment results in Example 2.

(1) The cells fabricated under the aforementioned five conditions maintained an electromotive force for 14 days. The total current produced during that period ranged from 3456 mAh to 5751 mAh, and the total electric energy from 869 mWh to 2471 mWh.

(2) As compared to when the electrolytic solution was 18% salt water, the cell produced a higher voltage and a higher current when the electrolytic solution was seawater concentrated to that same concentration.

(3) The cell which utilized an aqueous sodium hydroxide solution plus seawater as the electrolytic solution achieved a higher voltage and a higher current than the other cells.

Example 3

In the experiment of Example 3, magnesium fuel cells were fabricated under the following conditions 6 to 8 and were operated to supply current to motors. The negative electrode material used in Example 3 was a magnesium alloy sheet in which one side was covered with a tape and only the other side of the magnesium alloy was exposed.

(Conditions 6)

Negative electrode material: magnesium alloy containing 6 wt % Al and 2 wt % Ca

Positive electrode collector: carbon felt

Electrolytic solution: 18 wt % salt water (Conditions 7)

Negative electrode material: magnesium alloy containing 6 wt % Al and 0.3 wt % Mn Positive electrode collector: carbon felt Electrolytic solution: 18 wt % salt water (Conditions 8)

Negative electrode material: magnesium alloy containing 2 wt % Ca

Positive electrode collector: carbon felt

Electrolytic solution: 18 wt % salt water

Figure 17:
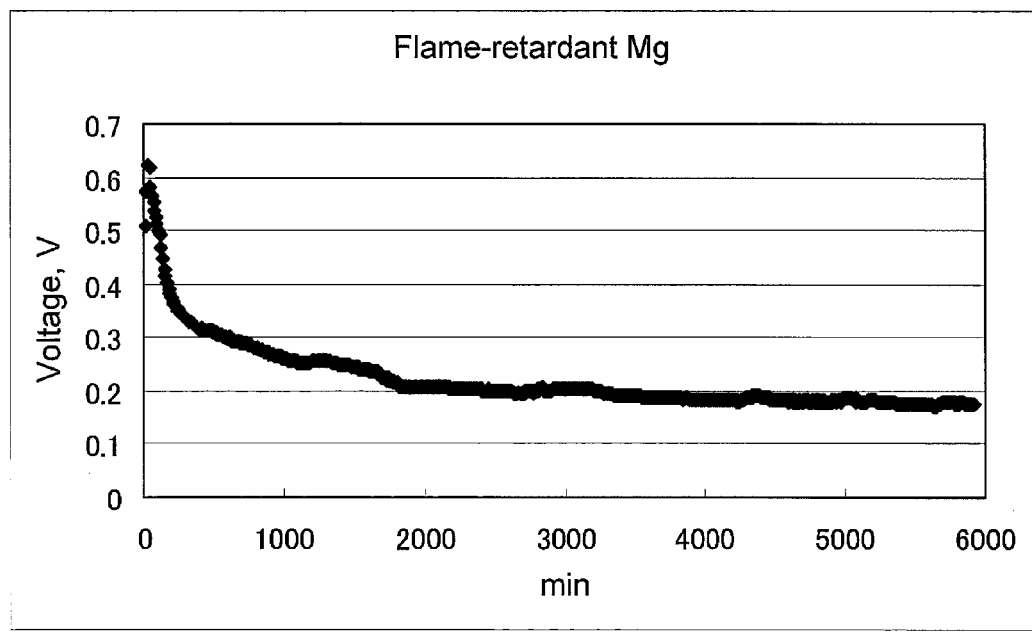
FIG. 17 is a graph illustrating changes in voltage when a cell fabricated under conditions 6 was operated.
Figure 18:
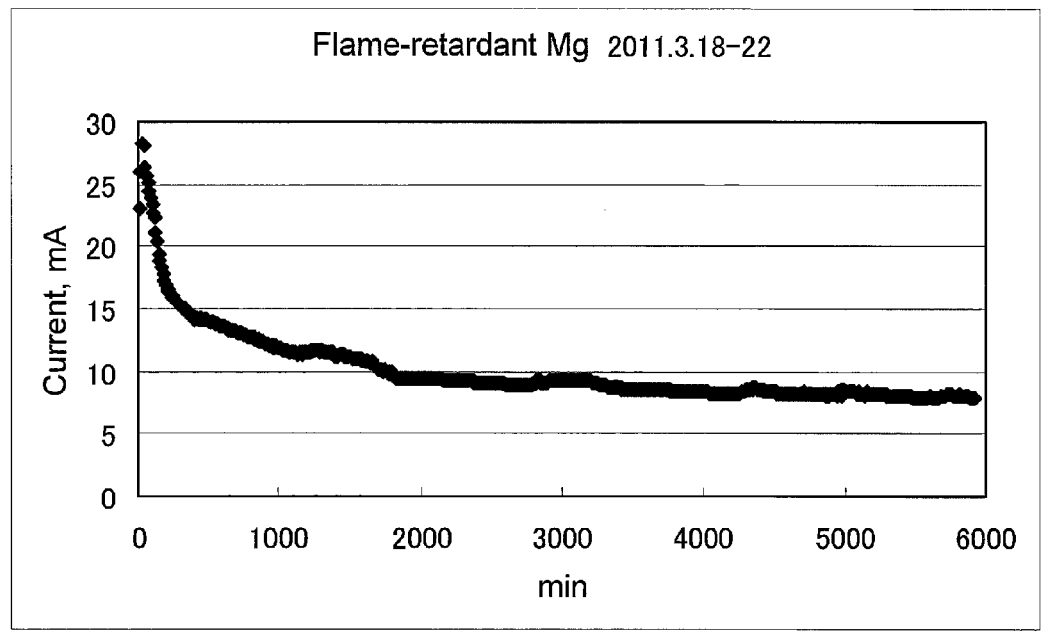
FIG. 18 is a graph illustrating changes in current when the cell fabricated under conditions 6 was operated.
Figure 19:
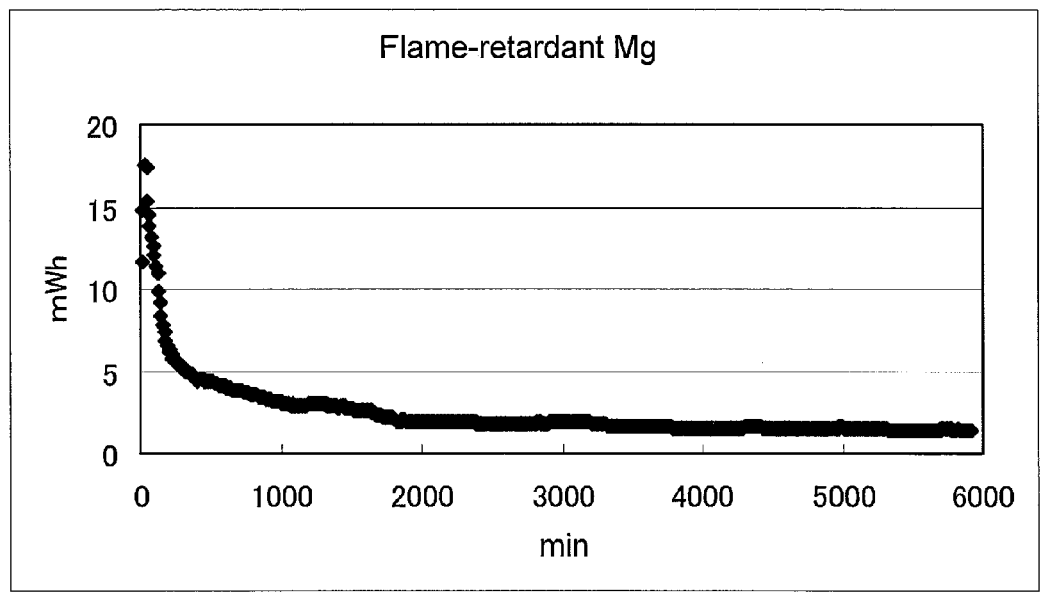
FIG. 19 is a graph illustrating changes in electric energy when the cell fabricated under conditions 6 was operated.
Figure 20:
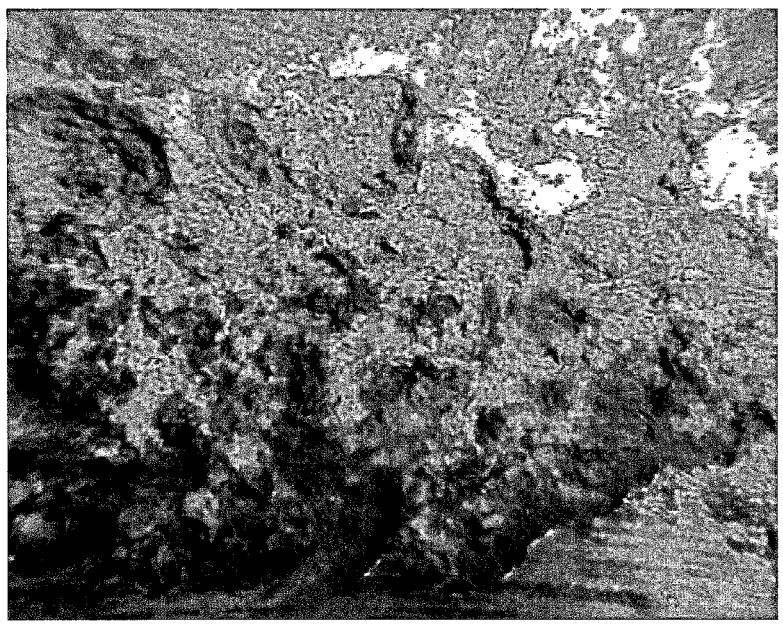
FIG. 20 is a picture showing the surface condition of a negative electrode material (a magnesium alloy) after the cell fabricated under conditions 6 was operated.

FIG. 17 to FIG. 19 are graphs illustrating changes in voltage, current and electric energy when the cell fabricated under the conditions 6 was operated for 100 hours. FIG. 20 is a picture showing the surface condition of the negative electrode material (the magnesium alloy) after the cell fabricated under the conditions 6 was operated.

The current flow experiment with the cell fabricated under the conditions 6 resulted in a weight decrease of the negative electrode material (the magnesium alloy) of 0.601 g, and a current and an electric energy per 1 g of the magnesium alloy of 1630 mAh/g and 476 mWh/g.

Further, as shown in FIG. 20, the negative electrode material (the magnesium alloy) had been corroded in a substantially uniform depth throughout the surface.

Figure 21:
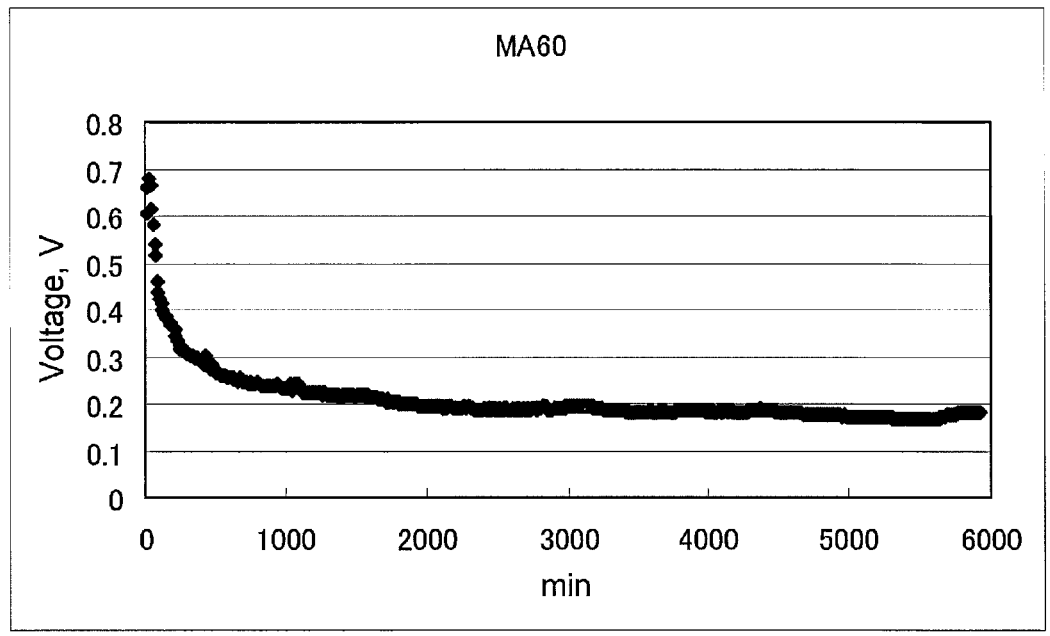
FIG. 21 is a graph illustrating changes in voltage when a cell fabricated under conditions 7 was operated.
Figure 22:
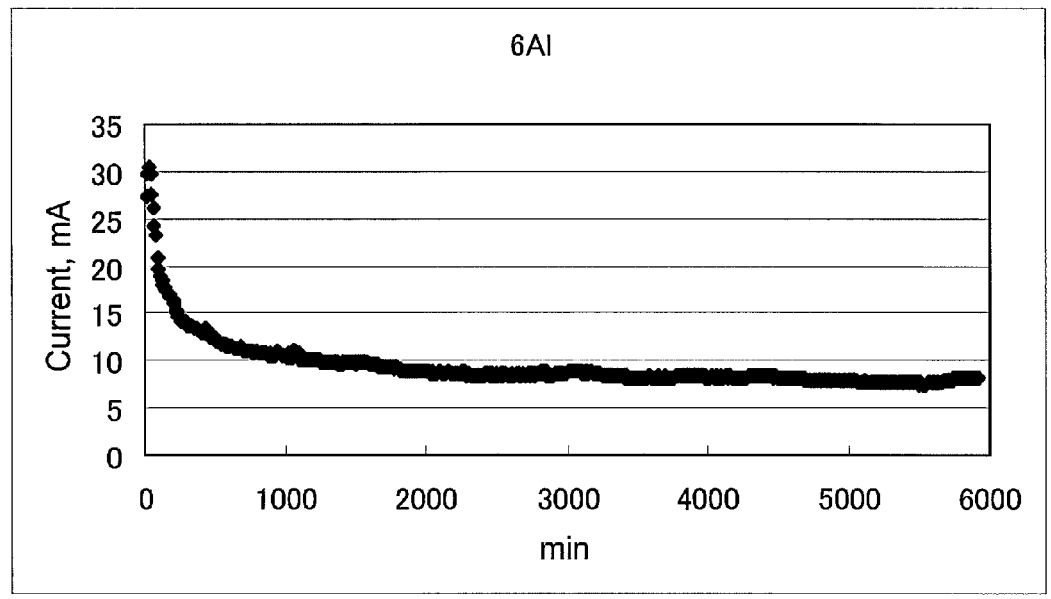
FIG. 22 is a graph illustrating changes in current when the cell fabricated under conditions 7 was operated.
Figure 23:
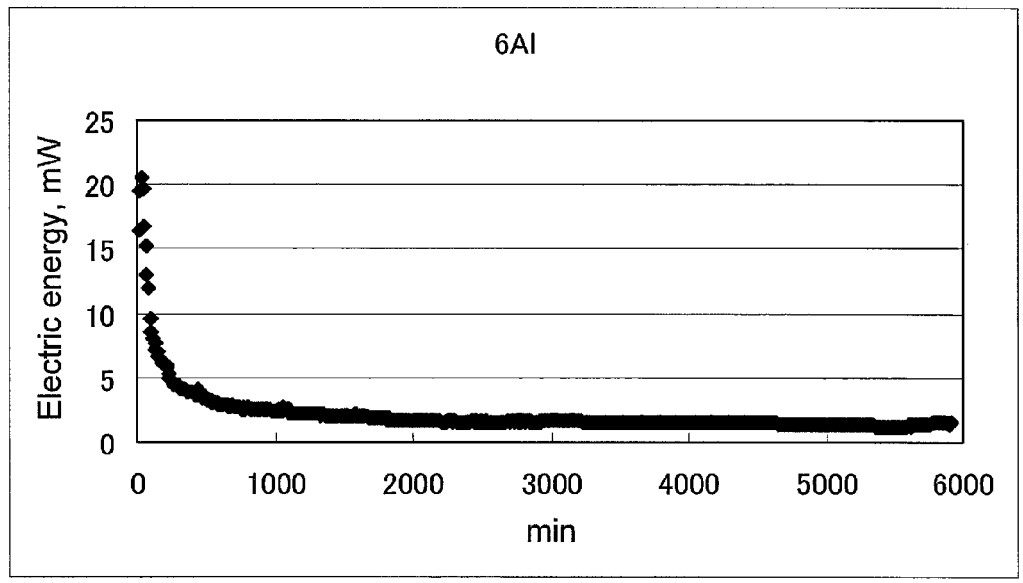
FIG. 23 is a graph illustrating changes in electric energy when the cell fabricated under conditions 7 was operated.
Figure 24:
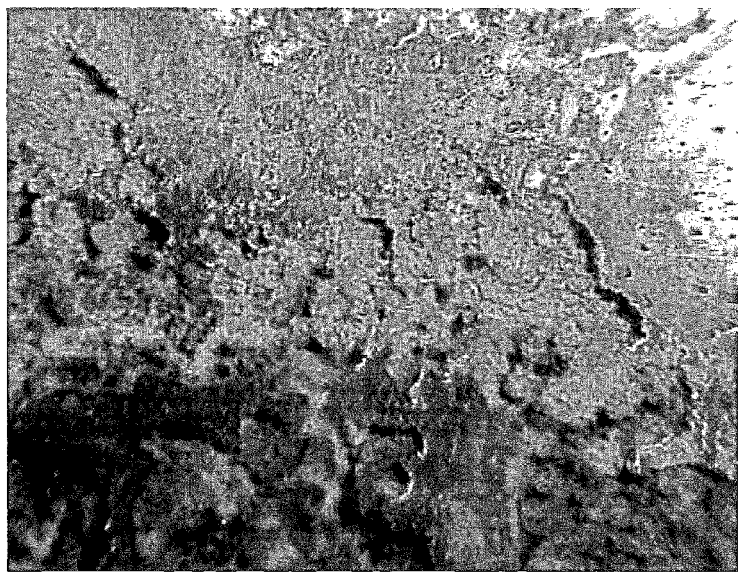
FIG. 24 is a picture showing the surface condition of a negative electrode material (a magnesium alloy) after the cell fabricated under conditions 7 was operated.

FIGS. 21 to 23 are graphs illustrating changes in voltage, current and electric energy when the cell fabricated under the conditions 7 was operated for 100 hours. FIG. 24 is a picture showing the surface condition of the negative electrode material (the magnesium alloy) after the cell fabricated under the conditions 7 was operated.

The current flow experiment with the cell fabricated under the conditions 7 resulted in a weight decrease of the negative electrode material (the magnesium alloy) of 0.781 g, and a current and an electric energy per 1 g of the magnesium alloy of 1181 mAh/g and 273 mWh/g.

Further, as shown in FIG. 24, the surface of the negative electrode material (the magnesium alloy) had been corroded locally in a large depth.

Figure 25:
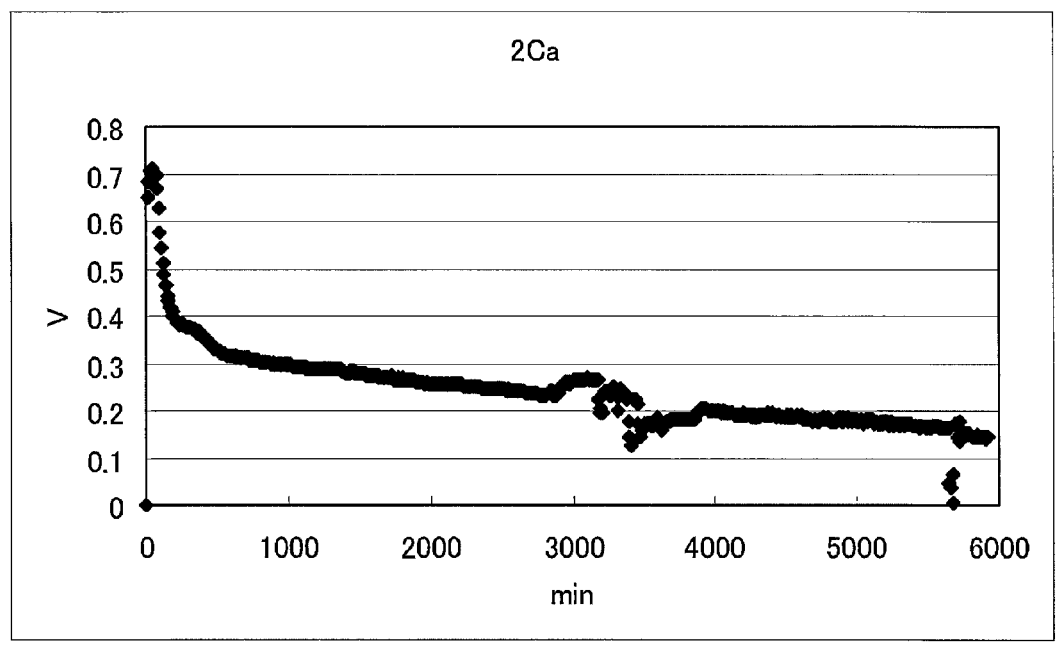
FIG. 25 is a graph illustrating changes in voltage when a cell fabricated under conditions 8 was operated.
Figure 26:
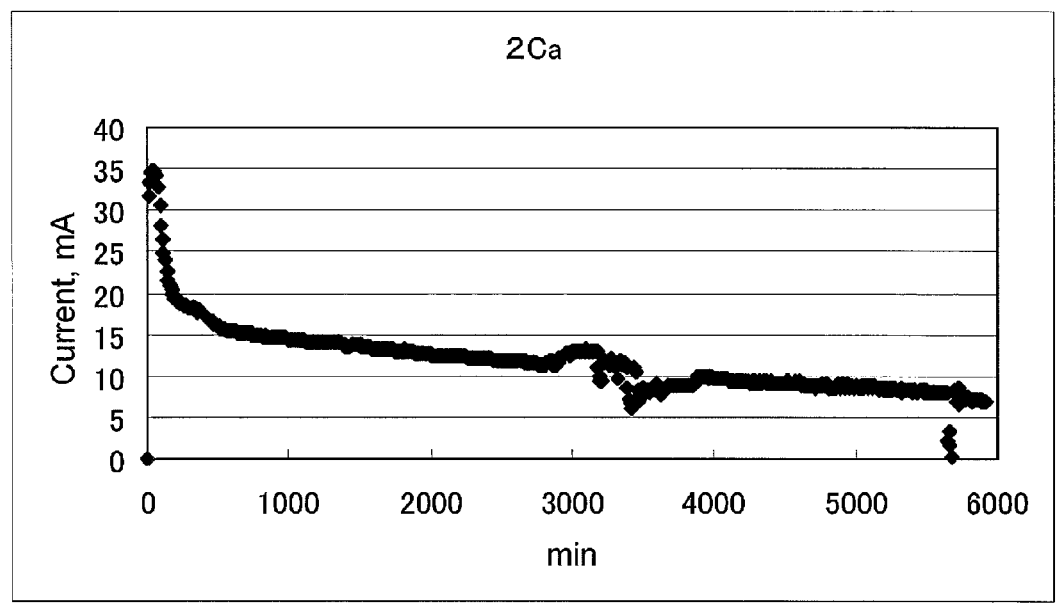
FIG. 26 is a graph illustrating changes in current when the cell fabricated under conditions 8 was operated.
Figure 27:
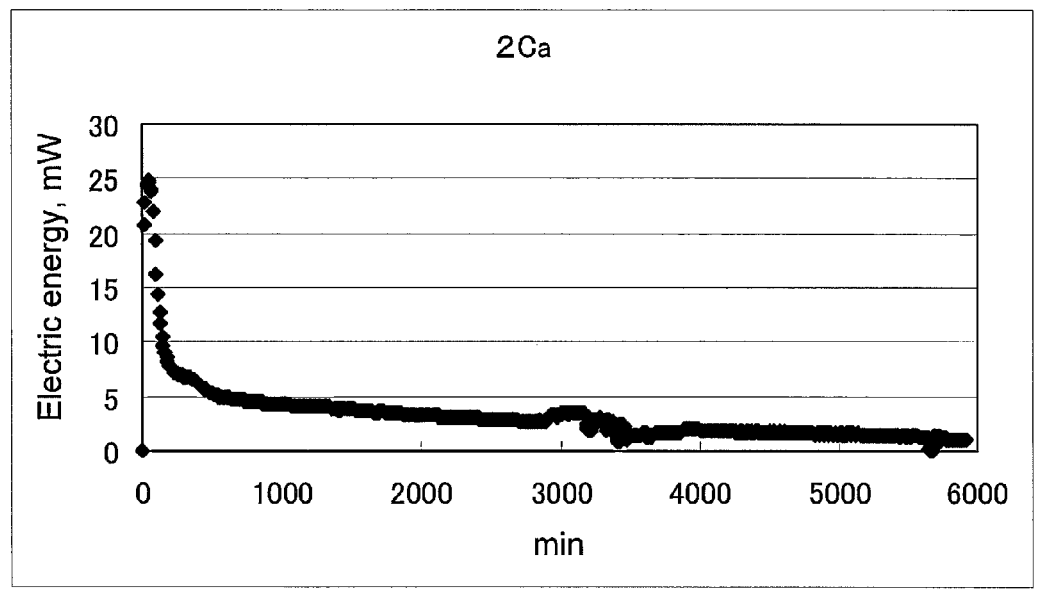
FIG. 27 is a graph illustrating changes in electric energy when the cell fabricated under conditions 8 was operated.
Figure 28:
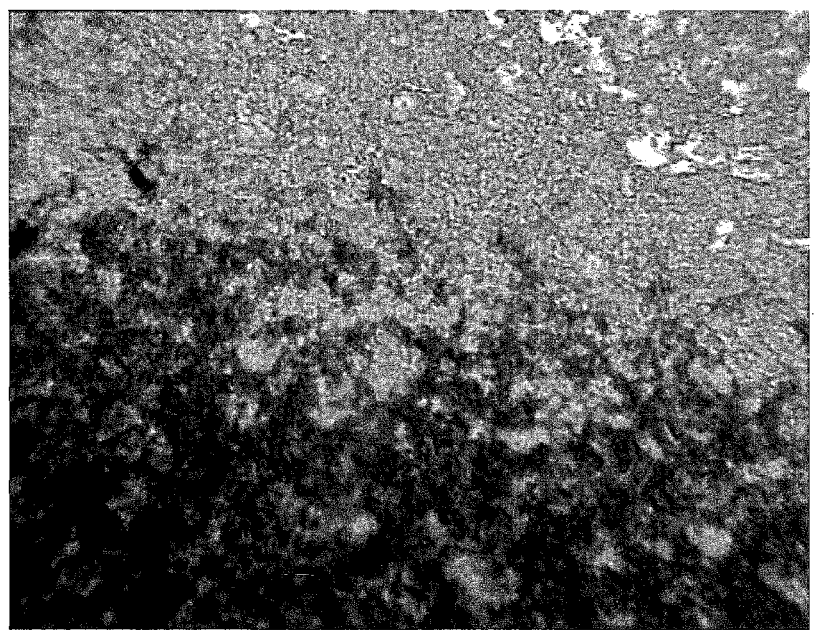
FIG. 28 is a picture showing the surface condition of a negative electrode material (a magnesium alloy) after the cell fabricated under conditions 8 was operated.

FIGS. 25 to 27 are graphs illustrating changes in voltage, current and electric energy when the cell fabricated under the conditions 8 was operated for 100 hours. FIG. 28 is a picture showing the surface condition of the negative electrode material (the magnesium alloy) after the cell fabricated under the conditions 8 was operated.

The current flow experiment with the cell fabricated under the conditions 8 resulted in a weight decrease of the negative electrode material (the magnesium alloy) of 1.597 g, and a current and an electric energy per 1 g of the magnesium alloy of 733 mAh/g and 200 mWh/g.

Further, as shown in FIG. 28, the negative electrode material (the magnesium alloy) had been corroded in a large depth throughout the surface.

Based on the experiment results in Example 3, it has been demonstrated that the cell fabricated under the conditions 6 produced a larger amount of current than by the cells fabricated under the conditions 7 and the conditions 8. With this result, the use of a magnesium alloy containing aluminum and calcium as a negative electrode material has been shown to allow for more stable production of electricity for a long time than by the use of conventional magnesium alloys.

Cell characteristics are evaluated based on two values: (1) the total current produced per unit weight of a metal electrode (a negative electrode) (=capacitance Ah/g), and (2) the total electric energy which is a product of the total current multiplied by voltage (=energy density Wh/g). The capacitance (Ah/g) is determined from the atomic weight of the metal, the charge number of ions, and the charge of electrons, and directly reflects the characteristics of the metal electrode. The theoretical capacitance of pure magnesium is 2.2 Ah/g. The magnesium alloy used in the invention contains magnesium in, for example, 92 wt %. The capacitance of this magnesium alloy is, for example, 1.63 Ah/g as described above. That is, the magnesium alloy used in the invention can produce approximately 80% of the electricity available according to the theoretical capacitance, and thus allows for highly efficient production of electricity.

On the other hand, the energy density is related to the voltage occurring in a cell. According to the ionization potential of the metal, magnesium cells have a possibility of producing 2.37 V potential.

However, the voltage occurring in a cell and thus the available energy density are significantly affected by the characteristics of the positive electrode. Because fuel cells, in particular, are of such a type that the positive electrode material is oxygen in air, the problem is how to react magnesium ions with oxygen so as to realize efficient extraction of charges.

Thus, the energy density is affected not only by the performance of the metal electrode (the negative electrode) but also by the configuration of the positive electrode (the air electrode) such as materials, catalysts and structures.

A cell was fabricated under the same conditions as the conditions 6, except that six parallel carbon sheets 5 cm in diameter were used as the positive electrode to enhance the performance of the air electrode. The voltage characteristics of this cell are illustrated in FIG. 29.

Figure 29:
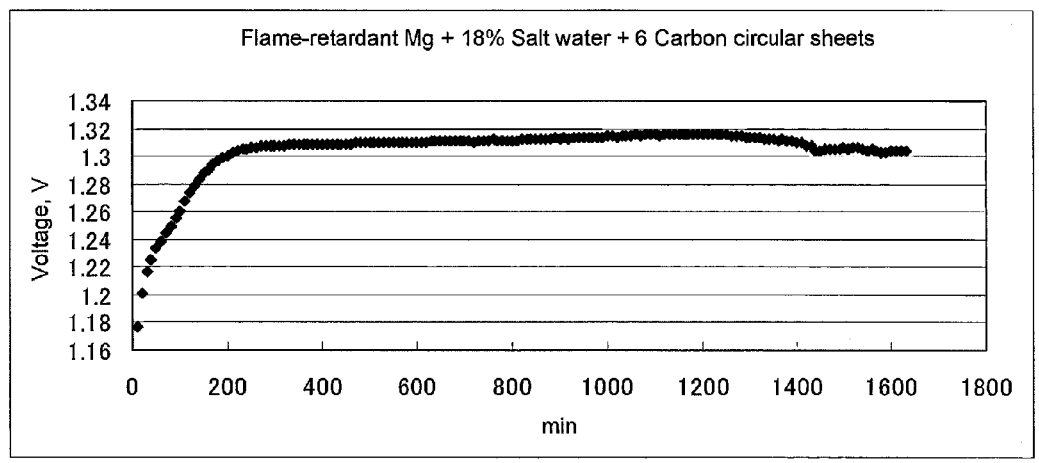
FIG. 29 illustrates changes in voltage of a flame-retardant Mg cell having six carbon sheets of activated carbon as a positive electrode.

As illustrated in FIG. 29, the cell having the positive electrode composed of the six parallel carbon sheets 5 cm in diameter had an average voltage of 1.30 V during 1600 minute operation. As compared to FIG. 17, the voltage did not decrease with the lapse of time, indicating that the voltage characteristics were markedly improved. This improvement in voltage characteristics is ascribed to changing the air electrode material from carbon felt to activated carbon having a large surface area, and to increasing the number of electrodes to 6 sheets.

The characteristics of the air electrode (the positive electrode) can be markedly enhanced by using catalysts.

A cell was fabricated under the same conditions as the conditions 6, except that the positive electrode was foamed nickel carrying a small amount of platinum and further coated with activated carbon. The voltage characteristics of this cell are illustrated in FIG. 30.

A cell was fabricated in which the positive electrode was foamed nickel carrying a small amount of platinum and further coated with activated carbon, and in which the negative electrode material was a magnesium alloy containing 3 wt % Al and 0.2 wt % Mn. The voltage characteristics of this cell are illustrated in FIG. 31.

As illustrated in FIG. 29, the cell having large carbon sheet electrodes required about 200 minutes until the voltage increased gradually to 1.3 V. In contrast, the use of a small amount of platinum catalyst allowed the cells to exhibit a voltage of about 1.3 V from the beginning as illustrated in FIG. 30 and FIG. 31.

Figure 30:
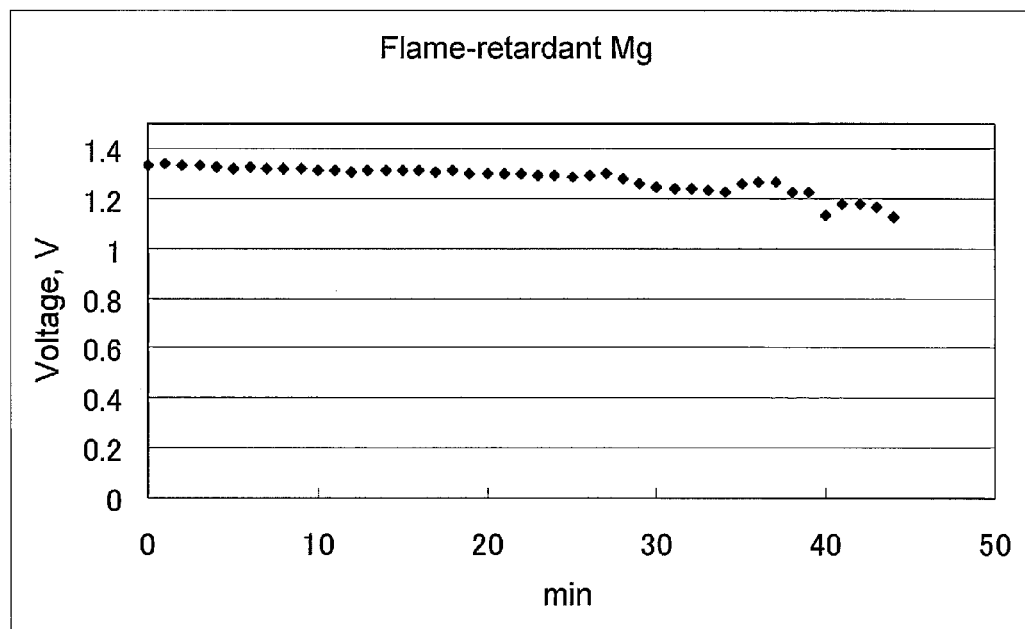
FIG. 30 illustrates voltages generated by a flame-retardant Mg cell having a platinum catalyst.
Figure 31:
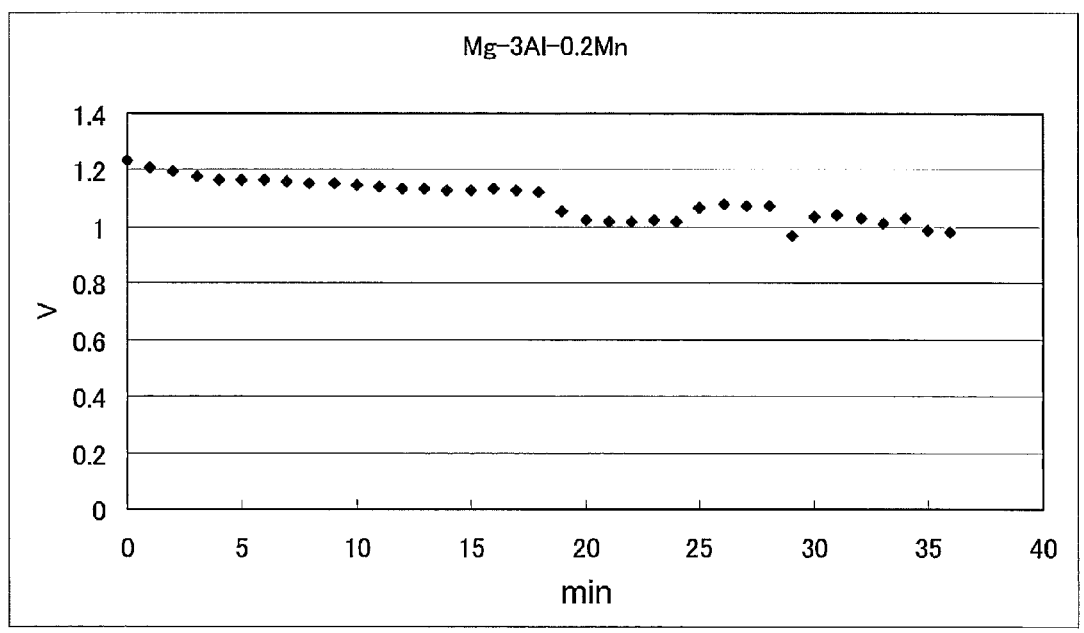
FIG. 31 illustrates voltages generated by a Mg-3Al-0.2Mn cell having a platinum catalyst.

From the comparison between FIG. 30 and FIG. 31, even though both the positive electrodes contained a catalyst, the cell having the inventive magnesium alloy (Mg-6Al-2Ca) achieved a higher voltage than the voltage produced by the cell having a conventional magnesium alloy (Mg-3Al-0.2Mn). Thus, the inventive magnesium alloy has been proven to have excellent characteristics as a negative electrode material.

REFERENCE SIGNS LIST

10 Magnesium fuel cell
12 Negative electrode material
14 Separator
16 Positive electrode collector
18 Electrolytic solution
20 Electrolytic solution tank

The invention claimed is:

1. A magnesium alloy fuel cell comprising a negative electrode material comprising a magnesium alloy, and
   an electrolytic solution for eluting magnesium ions from the negative electrode material,
   wherein the magnesium alloy contains 3 wt % to 9 wt % aluminum and 1 wt % to 3 wt % calcium, and
   wherein the content of lithium in the magnesium alloy is not more than 1 wt %.

2. The magnesium alloy fuel cell according to claim 1, wherein the electrolytic solution is at least one selected from the group consisting of an aqueous sodium chloride solution, an aqueous sodium hydroxide solution, an aqueous sodium hydrogencarbonate solution and an aqueous sodium percarbonate solution.

3. The magnesium alloy fuel cell according to claim 1, wherein the magnesium alloy contains 5 wt % to 7 wt % aluminum and 1.5 wt % to 2.5 wt % calcium.

4. A negative electrode material used for a magnesium alloy fuel cell, the magnesium alloy fuel cell comprising the negative electrode material comprising a magnesium alloy, and an electrolytic solution for eluting magnesium ions from the negative electrode material,
   wherein the magnesium alloy contains 3 wt % to 9 wt % aluminum and 1 wt % to 3 wt % calcium, and
   wherein the content of lithium in the magnesium alloy is not more than 1 wt %.

5. The negative electrode material according to claim 4, wherein the electrolytic solution is at least one selected from the group consisting of an aqueous sodium chloride solution, an aqueous sodium hydroxide solution, an aqueous sodium hydrogencarbonate solution and an aqueous sodium percarbonate solution.

6. The negative electrode material according to claim 4, wherein the magnesium alloy contains 5 wt % to 7 wt % aluminum and 1.5 wt % to 2.5 wt % calcium.

* * * * *